(12) United States Patent
Hagiwara

(10) Patent No.: US 8,105,143 B2
(45) Date of Patent: Jan. 31, 2012

(54) PUZZLE ELEMENTS DISPLAYING GAME APPARATUS AND STORAGE MEDIUM STORING PUZZLE ELEMENTS DISPLAYING GAME PROGRAM

(75) Inventor: Takamitsu Hagiwara, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 1827 days.

(21) Appl. No.: 11/242,134

(22) Filed: Oct. 4, 2005

(65) Prior Publication Data

US 2006/0073863 A1 Apr. 6, 2006

(30) Foreign Application Priority Data

Oct. 4, 2004 (JP) ................................. 2004-291440
Sep. 28, 2005 (JP) ................................. 2005-282735

(51) Int. Cl.
*A63F 9/24* (2006.01)
(52) U.S. Cl. ....................................... 463/9; 273/153 R
(58) Field of Classification Search ... 463/9; 273/153 R
See application file for complete search history.

(56) References Cited

U.S. PATENT DOCUMENTS 5,417,425 A * 5/1995 Blumberg et al. ......... 273/153 R
7,077,744 B2 * 7/2006 Cannon ............................ 463/20

FOREIGN PATENT DOCUMENTS

| JP | 04-054986 | 2/1992 |
| JP | 07-204353 | 8/1995 |
| JP | 2000-197770 | 7/2000 |

OTHER PUBLICATIONS

Excerpt of "Shukan Famitsu" Aug. 12 issue sold on Jul. 29, 2005 by Enterbrain, 4 pages.
Excerpt of "FamitsuCUBE plus ADVANCE" Oct. 2005 issue sold on Aug. 20, 2005 by Enterbrain, 4 pages.
Excerpt of "Dengeki GAME CUBE" Oct. 2005 issue sold on Aug. 20, 2005 by Media Works, 4 pages.
Excerpt of "Nintendo DREAMS" Oct. 2005 issue sold on Aug. 20, 2005 by Mainichi Communications, 5 pages.
Excerpt of "Dengeki Playstation" vol. 323 sold on Aug. 26, 2005 by Media Works, 4 pages.
Excerpt of "DORIMAGA" October issue sold on Aug. 30, 2005 by Softbank Publishing, 3 pages.
Excerpt of "Dengeki GAME CUBE" Nov. 2005 issue sold on Sep. 21, 2005 by Media Works, 4 pages.
Excerpt of "FamitsuCUBE plus ADVANCE" Nov. 2005 issue sold on Sep. 21, 2005 by Enterbrain, 4 pages.
http://www.nintendo.co.jp/n08/biij/index.html (Renewed on Sep. 16, 2005), 8 pages.
http://plusd.itmedia.co.jp/games/articles/0509/05/news065.html (Renewed on Sep. 5, 2005), 3 pages.

(Continued)

*Primary Examiner* — Corbett B Coburn
(74) *Attorney, Agent, or Firm* — Nixon & Vanderhye P.C.

(57) ABSTRACT

A game machine includes an LCD. The LCD displays a plurality of puzzle elements of different kinds. When a player uses an input means such as an operating key and a touch panel to designate some puzzle elements consecutively in the manner of one-stroke drawing, the kind of the designated puzzle elements is changed to another one. One stage of game is cleared if display of the changed puzzle elements has entered a predetermined state or met a predetermined requirement.

26 Claims, 23 Drawing Sheets

OTHER PUBLICATIONS http://plusd.itmedia.co.jp/games/articles/0509/05/news065.html (Renewed on Sep. 13, 2005), 3 pages.

http//kids.goo.ne.jp/cgi-bin/kgframe.php?BL=0&SY=2&MD=2&TP=http://plusd.itmedia.co.ip/games/articles/0509/05/newso65.html (Renewed on Sep. 13, 2005), 3 pages.

http://eg.nttpub.com.jp/game/ntd05022.html (Renewed on Sep. 13, 2005), 2 pages.

http://gameinfo.yahoo.co.jp/gl?ty=gd&id=ntd05022 (Renewed on Sep. 13 2005), 2 pages.

http://www.nintendo-inside.jp/news/167/16759.html (Renewed on Sep. 13, 2005), 2 pages.

http //game.nifty_com/info/title/ntd05022.htm (Renewed on Sep. 13, 2005), 2 pages.

http://www.famitsu_com/game/coming/2005/09/09/104, 1126250272,43 153,0.0.html (Renewed on Sep. 13, 2005), 2 pages.

Tetris, http://www.nintendo.co.jp/n02/dmg/tra/index.html, three pages, 1989.

"One stroke"-typed puzzle game, Micon BASIC Magazine, DEMPA Publications, Inc., Feb. 1, 1990, vol. 9, No. 2, p. 106-107, partial translation.

"KGryzzles", Linux Magazine, Sep. 2000, ASCII Media Works, Sep. 1, 2000, vol. 2, No. 9/ Nos. 12, p. 63, partial translation.

V Jump Books [Game Series] "Golden Sun: The lost age, The Complete for Game Boy Advance" published by Shueisha Publishing Co., Ltd., Jul. 3, 2002, First ed., p. 387, ISBN4-08-779175-0, partial translation.

FreeBSD Press, No. 18, published by Mainichi Communications, Aug. 18, 2003, p. 20, partial translation.

* cited by examiner

FIG. 13
(A) INITIAL SCREEN
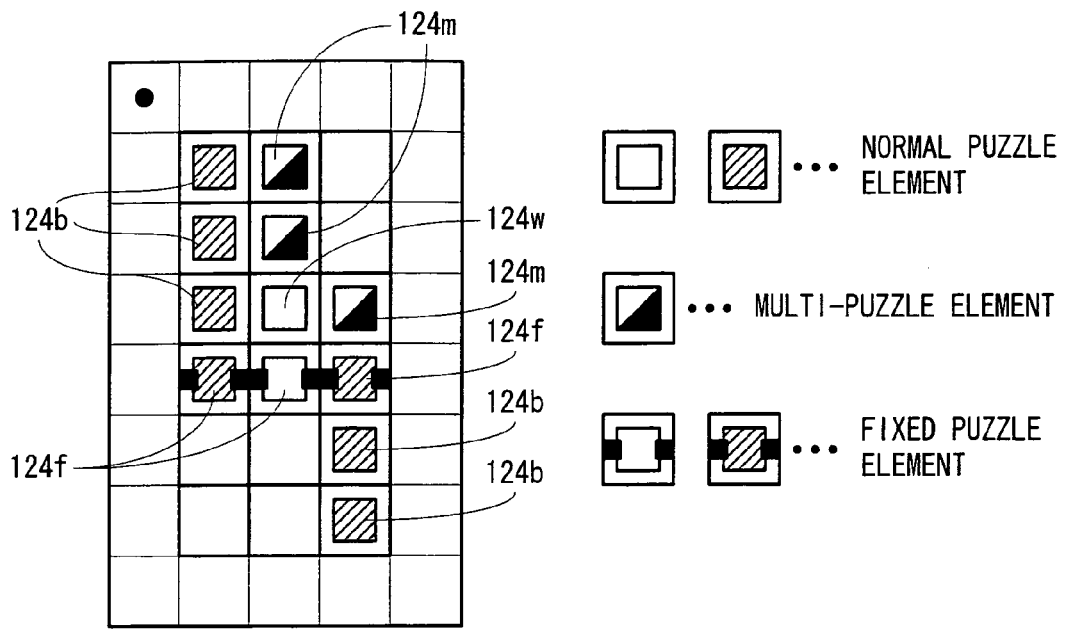
(B) PANEL NUMBERS
| B1 | B2 | B3 | B4 | B5 |
|---|---|---|---|---|
| B22 | A1 | A2 | A3 | B6 |
| B21 | A4 | A5 | A6 | B7 |
| B20 | A7 | A8 | A9 | B8 |
| B19 | A10 | A11 | A12 | B9 |
| B18 | A13 | A14 | A15 | B10 |
| B17 | A16 | A17 | A18 | B11 |
| B16 | B15 | B14 | B13 | B12 |
(C) DESIGNATION OF START-POINT POSITION
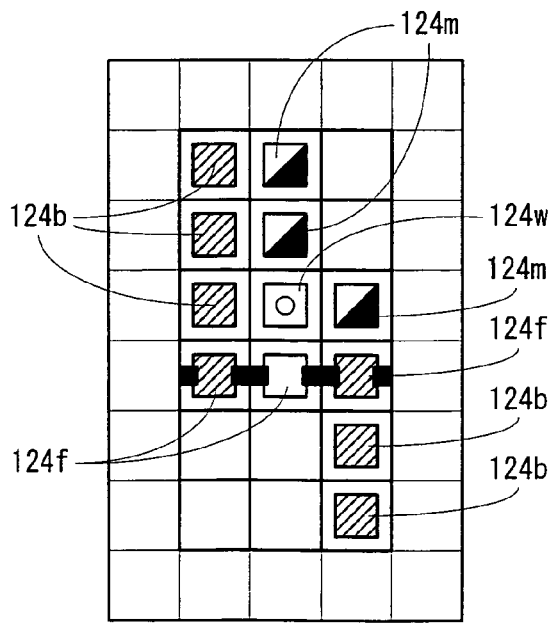

FIG. 15
(A) CHANGE OF DISPLAY STATE (4)
(B) CHANGE OF DISPLAY STATE (5)
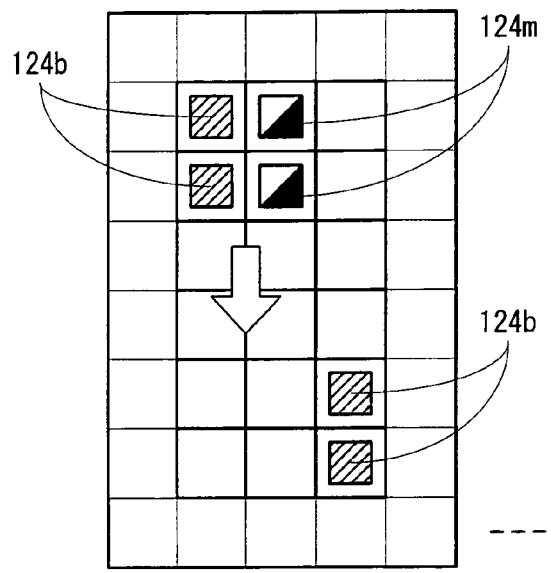
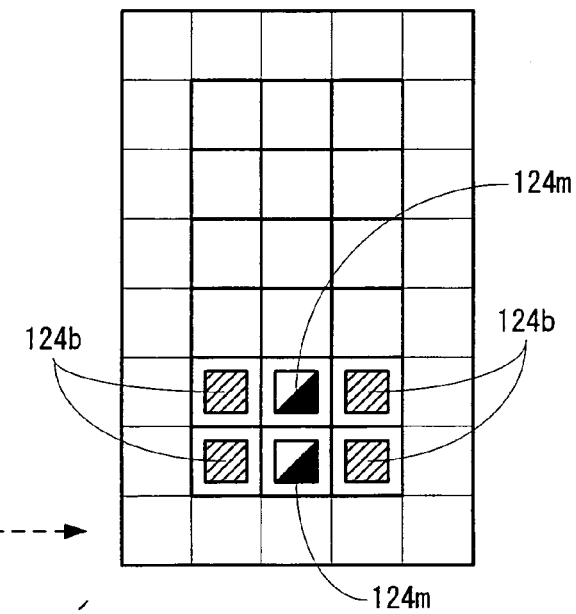
(C) CHANGE OF DISPLAY STATE (6)
(D) CHANGE OF DISPLAY STATE (7) AND CLEARING OF GAME
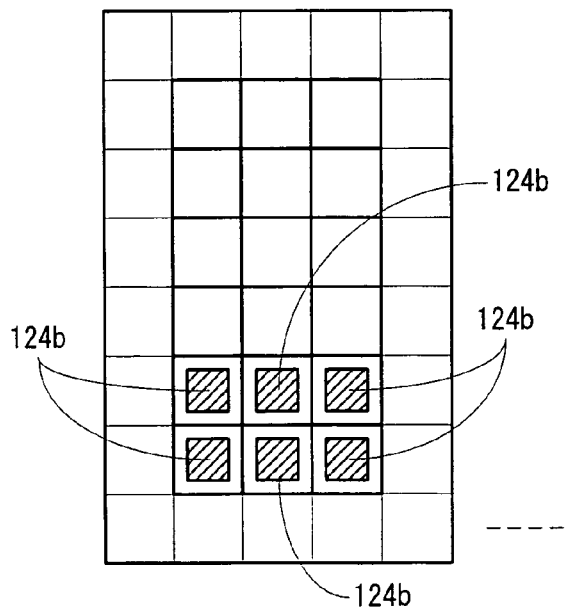
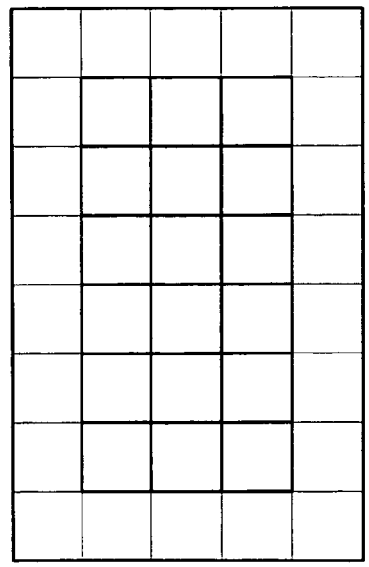

FIG. 20
(A) IMAGE OF INITIAL SCREEN FOR QUESTION PREPARATION
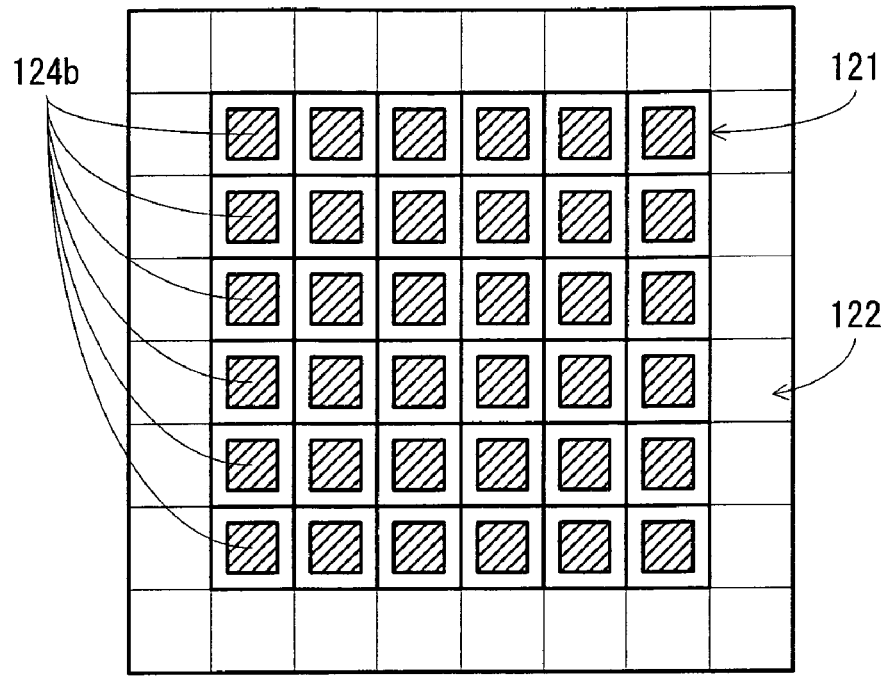
(B) IMAGE OF START-POINT DECISION SCREEN
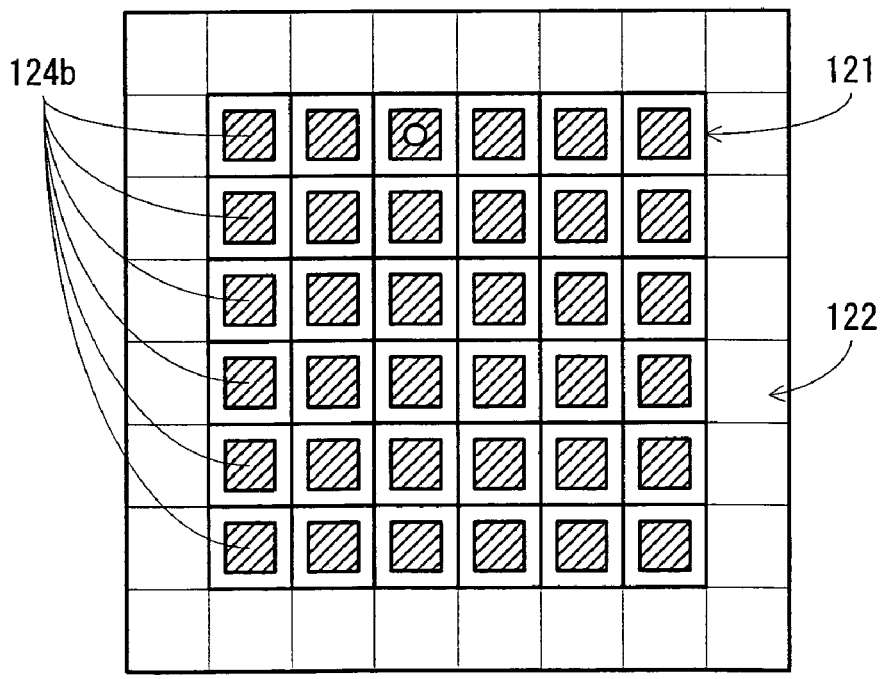

FIG. 21
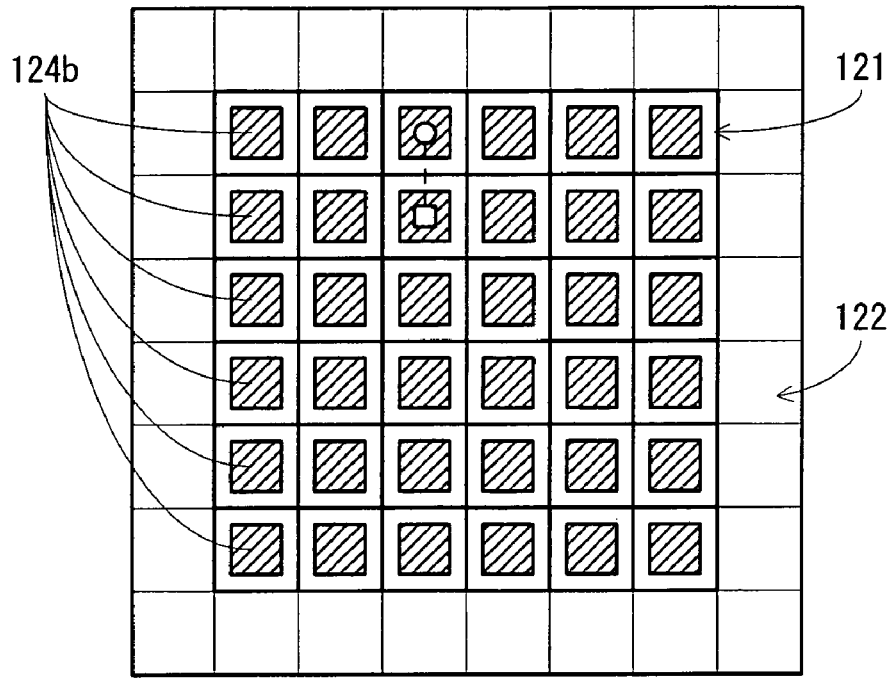
(A) IMAGE OF SCREEN IN WHICH NEXT CELL IS DECIDED AT RANDOM FROM START POINT
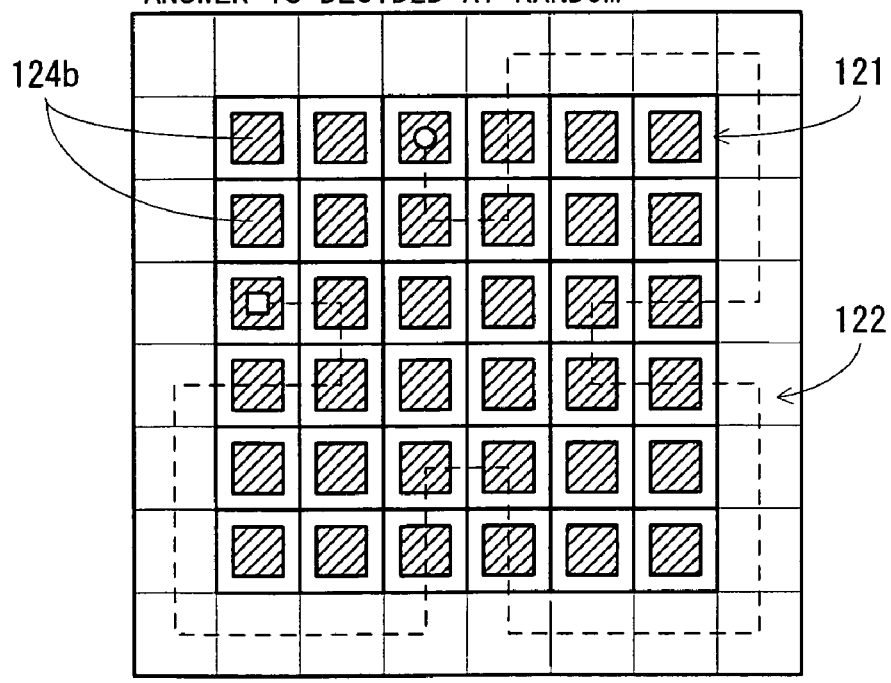
(B) IMAGE OF SCREEN IN WHICH ONE-STROKE ANSWER IS DECIDED AT RANDOM

PUZZLE ELEMENTS DISPLAYING GAME APPARATUS AND STORAGE MEDIUM STORING PUZZLE ELEMENTS DISPLAYING GAME PROGRAM

TECHNICAL FIELD

The present invention relates to a puzzle element display game apparatus and a storage medium storing a puzzle element display game program. More specifically, the present invention relates to a puzzle element display game apparatus and a storage medium storing a puzzle element display game program that allow a player to enjoy a novel puzzle game by designating puzzle elements to be changed in the manner of one-stroke drawing, in a display area where a plurality of puzzle elements of at least two kinds are displayed lengthwise and breadthwise.

BACKGROUND AND SUMMARY

Conventional puzzle games include a game in which puzzle elements of different shapes are falling from above (the product name "Tetris": document 1), and a game in which a predetermined number of objects formed by combinations of blocks of different kinds are linked to one another as shown in document 2 (Japanese Patent No. 2775334) and document 3 (Japanese Patent No. 3339158).

The puzzle game Tetris was released on Jun. 14, 1989 by the applicant of the present invention, as a software game for the hand-held game machine "GAMEBOY". In this game, blocks of seven forms (Z-shaped, inverted Z-shaped, L-shaped, inverted L-shaped, convex, square, and rod-shaped, for example) made from combinations of four small squares are falling from the upper part of the screen. In the meantime, when the player operates those blocks in such a manner as to change their orientations and pile-up positions and then aligns the blocks in a line sideways with no space between them, the blocks in the line are erased and some score is given to the player. Tetris is a game to be played in such a manner to fit a block in an appropriate orientation into an appropriate position between the instant when the block is displayed on the top line of the screen and the instant when the block reaches a pile of blocks on the bottom. This game thus requires a player of good reflexes or high reaction speed as well as high thinking faculty, and may be easy for the player to get tired of playing it due to limited numbers of combinations of block orientations and fitting positions. In addition, the puzzle game shown in document 1 may be less interesting in terms of variety because it may be easy for the player to foresee a change in the state of screen display after the fitting of a block and thus no surprising variations in display state can be expected.

The puzzle game described in document 2 and document 3 is a game in which blocks of different kinds are displayed in a state of falling from the top. When a plurality of blocks of the same kind are successfully combined with one another so as to form a predetermined number of or more links, the linked blocks (or puzzle elements) are erased. The game of document 2 and document 3 is also a game to be performed in such a manner as to fit a block in an appropriate orientation into an appropriate position between the instant when the block is displayed on the top line of the screen and the instant when the block reaches a pile of blocks on the bottom. This game thus requires a player of good reflexes or high reaction speed as well as high thinking faculty and may be easy for the player to get tired of playing it due to limited numbers of combinations of block orientations and fitting positions.

Additionally, the puzzle game shown in document 2 and document 3 may be less interesting in terms of variety because it is easy for the player to foresee a change in the state of screen display after the fitting of a block and thus no surprising variations in display state can be expected.

Furthermore, in Tetris and the games of document 2 and document 3, the player designates the orientation of a falling block and the stop position of the block. These games do not make it possible to change the display state of the stopped block while requiring a player of good reflexes and high reaction speed. Thus, these games may not be preferred by some users who are not good at competing in reflexes and reaction speed. This will be an obstacle to the expansion of the user base.

Therefore, it is a feature of the present invention to provide a puzzle element display game apparatus and a puzzle element display game program that, in the state where a plurality of puzzle elements are stopped in a display area, make it possible to designate puzzle elements to be changed in the manner of one-stroke drawing and enjoy a novel and innovative puzzle game requiring a player of a high-level thinking faculty as well as good reflexes and high reaction speed.

It is another feature of the present invention to provide a puzzle element display game apparatus and a puzzle element display game program that make it possible to offer a high degree of flexibility in selecting a puzzle element capable of being changed by the player's operation, out of a plurality of puzzle elements stopped in the display area, and perform game operations and display state changes in a wide variety of manners, thereby making the player feel interest in the game operations and display states.

It is still another feature of the present invention to provide a puzzle element display game apparatus and a puzzle element display game program that make it possible to enjoy a puzzle game having easy-to-understand rules but requiring a high-level thinking faculty, by designating puzzle elements of one of two kinds in the manner of one-stroke drawing to change it into a puzzle element of the other kind.

It is further another feature of the present invention to provide a puzzle element display game apparatus and a puzzle element display game program that make it possible to pass through a movable area even if there is no puzzle element of a type to be changed exists along the direction of movement in the display area of puzzle elements and to select a continuous passable area from a start point to an end point so as to become longer without any interruption.

It is yet another feature of the present invention to provide a puzzle element display game apparatus and a puzzle element display game program that makes it possible to designate a plurality of puzzle elements displayed in the display area in a direct manner, not by the medium of a cursor or a direction designating switch, thereby bringing about the convenience of operation.

A puzzle element display game apparatus according to the present invention comprises a display part (in correspondence with LCD 12 in the detailed description presented later. The same applies to the following components), a puzzle element type storing means (RAM), an initial screen data storing means (storage area 212 in ROM 21), an operating means (touch panel 16 or direction switch 15*a*, A button 15*d*, B button 15*e*, etc.), a moving route data storing means (RAM), a program storing means (ROM 215), and a display controlling means (CPU).

The display part has a display area to which a plurality of cells are assigned lengthwise and breadthwise, and displays puzzle elements in the plurality of cells contained in the display area. The puzzle element type storing means stores data on puzzle element type in order to display at least one of two kinds of puzzle elements in correspondence with the plurality of lengthwise and breadthwise cells. The initial screen data storing means stores data on puzzle element type for displaying at least one of two kinds of puzzle elements in the display screen, as at least a screenful of data for an initial screen (or a start screen), and also stores passing area display data for displaying a passable area around the display area. The operating means, when a coordinate position is designated in the display area of the display part by manipulating the operating means, specifies the change of a puzzle element in the designated coordinate position into a puzzle element of a different kind. The moving route data storing means temporarily stores data on the moving route (moving route data) from the designation of start-point coordinates to the designation of end-point coordinates through manipulation of the operating means. The program storing means stores a program for controlling a game. The display controlling means makes a change to an image displayed in the display part, based on the manipulations of the operating means and the game program, and also performs the following operations in order.

More specifically, the display controlling means, in response to the designation of a start of a game through manipulation of the operating means, writes a screenful of the initial screen data stored in the initial screen data storing means into a corresponding storage area in the puzzle element type storing means. The display controlling means also allows some kind of puzzle element to be displayed in each of the cells in the display area, based on the storage state of the puzzle element type storing means. In addition, the display controlling means allows the passable area around the display area based on the passing area display data stored in the initial screen data storing means, and writes the data on the moving route from the designation of start-point coordinates to the designation of end-point coordinates through manipulation of the operating input means, into the moving route data storing means. Moreover, the display controlling means, after the designation of the end-point coordinates, writes the type data of the puzzle elements changed in kind into a storage area in the puzzle element type storing means corresponding to the individual puzzle elements on the moving route, based on the moving route data stored in the moving route data storing means and the storage state of type data in the puzzle element type storing means. Furthermore, the display controlling means, after the change of the kind of the puzzle elements, when it is concluded that the puzzle elements have entered into a predetermined display state based on the puzzle element type data stored in the puzzle element type storing means, changes the storage state of the puzzle element type storing means in such a manner as to erase the puzzle elements in the predetermined display state.

This implements a puzzle element display game apparatus that makes it possible to enjoy a novel and innovative puzzle game requiring a high-level thinking faculty as well as good reflexes and high reaction speed, by designating puzzle elements to be changed in the manner of one-stroke drawing when the puzzle elements are in a resting state.

In one embodiment, the initial screen data storing means further stores passing area display data for displaying a passable area around the display area. The display controlling means allows a passable area to be displayed around the display area based on the passing area display data stored in the initial screen data storing means, and also writes the data indicative of the positions of the puzzle elements and the passing area, designated as moving route data, into the moving route data storing means. This makes it possible to, even if there exists no puzzle element to be changed along the direction of the movement, designate the puzzle elements bypassing the passable area, increase the number of consecutively designable puzzle elements and erase the puzzle elements with a small number of strokes.

Another puzzle element display game apparatus according to the present invention comprises a display part (in correspondence with LCD 12 in the detailed description. The same applies to the following components.), a puzzle element type storing means (RAM), an initial screen data storage means (storage area 212 in ROM 21), an operating means (touch panel 16 or direction switch 15a, A button 15d, B button 15e, etc.), a moving route data storing means (RAM), a program storing means (ROM 215), and a display controlling means (CPU).

The display part has a display area to which a plurality of cells are assigned lengthwise and breadthwise, and displays puzzle elements in the plurality of cells contained in the display area. The puzzle element type storing means stores puzzle element type data in order to display at least one of two kinds of puzzle elements in correspondence with the plurality of lengthwise and breadthwise cells. The initial screen data storing means stores the puzzle element type data for displaying at least one of two kinds of puzzle elements in the display screen, as at least a screenful of data for initial screen (or start screen), and also stores passing area display data for displaying a passable area around the display area. The operating means, when a coordinate position is designated in the display area of the display part through manipulation of the operating means, specifies the change of a puzzle element in the designated coordinate position into a puzzle element of a different kind. The moving route data storing means temporarily stores data on a moving route (moving route data) from the designation of start-point coordinates to the designation of end-point coordinates through manipulation of the operating means. The program storing means stores a program for controlling a game. The display controlling means changes an image to be displayed in the display part based on the manipulation of the operating means and the game program, and also performs the following operations in order.

More specifically, the display controlling means, in response to the designation of the start of a game through manipulation of the operating means, writes a screenful of initial screen data stored in the initial screen data storing means into a corresponding storage area in the puzzle element type storing means. The display controlling means also allows some kind of puzzle element to be displayed in each of cells in the display area, based on the storage state of the puzzle element type storing means. In addition, the display controlling means allows the passable area to be displayed around the display area based on the passing area display data stored in the initial screen data storing means, and writes the moving route data from the designation of start-point coordinates to the designation of end-point coordinates through manipulation of the operation input means, into the moving route data storing means. Moreover, the display controlling means, after the designation of the end-point coordinates, writes the type data on the puzzle elements changed in kind into a storage area in the puzzle element type storing means corresponding to the individual puzzle elements on the moving route, based on the moving route data stored in the moving route data storing means and the storage state of the type data in the puzzle element type storing means. Furthermore, the display controlling means, when it concludes that the puzzle elements have entered into a predetermined display state based on the puzzle element type data stored in the puzzle element type storing means after the changing of the type of the puzzle elements, changes the storage state of the puzzle element type storing means in such a manner as to erase the puzzle elements in the predetermined display state.

This implements a puzzle element display game apparatus requiring a high-level thinking faculty as well as good reflexes and high reaction speed, which has specific advantages that make it possible to designate puzzle elements to be changed in the manner of one-stroke drawing when the puzzle elements are in a resting state, and, even if there exists no puzzle element to be changed along the direction of the movement, designate the puzzle elements bypassing the passable area, increase the number of consecutively designable puzzle elements and erase the puzzle elements with a small number of strokes.

In one embodiment, the puzzle element type storing means stores type data of a first puzzle element and type data of a second puzzle element as the type data. The moving route data storing means stores data corresponding to the coordinate positions of the cells for puzzle elements on the continuous moving route from the start-point coordinate position to the end-point coordinate position and, if any of the passable areas is contained in the continuous moving route, stores data corresponding to the coordinate position of the passable area. After the display controlling means changed the type of the puzzle element into another one, when the puzzle element type data stored in the puzzle element type storing means indicates that the puzzle elements at least in one line and in one direction has become identical in kind, the display controlling means concludes that the puzzle elements have entered a predetermined display state (the puzzle elements of the same kind are lined up lengthwise and/or breadthwise). This makes it possible to enjoy a puzzle game having easy-to-understand rules but requiring a high-level thinking faculty, by designating one of the two kinds of puzzle elements in the manner of one-stroke drawing and changing them into puzzle elements of the other kind.

In another embodiment, the puzzle element display area is rectangular in shape, and the passable area is displayed so as to surround the rectangular puzzle element display area by one cell. This makes it possible to pass through the movable area even when there exists no puzzle element of the type to be changed along the direction of the movement in the puzzle element display area, lengthen the moving route from the start point to the end point (one-stroke route or form) without any interruption in the continuous moving route and erase a screenful of puzzle elements with a small number of strokes or a single stroke, thereby allowing the player to feel great gratification.

In still another embodiment, when the moving route data from the designation of the start-point coordinates to the designation of the end-point coordinates is being written into the moving route data storing means, if the moving route with the same coordinate positions is redundantly designated, the display controlling means prohibits a writing operation for changing the puzzle element type. This makes it possible to prevent the redundant designation of puzzle elements in the same coordinate positions in designating the moving route with one stroke, which makes the game more interesting with an enhanced difficulty level.

In further another embodiment, the display part is a liquid crystal display, and the puzzle element display game apparatus is a hand-held game machine including a housing with the liquid crystal display on the surface, and the operating means is composed of a touch panel attached to the surface of the liquid crystal display. Also, when the touch panel is operated, the display controlling means detects a continuous moving route from the designation of start-point coordinates to the designation of end-point coordinates out of a plurality of puzzle elements displayed on the liquid display, and writes the data on the moving route into the moving route data storing means. This allows the player to designate the plurality of puzzle elements displayed in the display area directly from the touch panel, not by the medium of the cursor or the direction designating switch, which results in the convenience of operation.

Another puzzle element display game apparatus comprises a display part (in correspondence with LCD 12 in the detailed description presented later. The same applies to the following components.), a puzzle element type storing means (RAM), an operating means (touch panel 16, or direction switch 15*a*, A button 15*d*, B button 15*e*, etc.), a display controlling means (CPU), a puzzle element changing means (CPU), and a determining means (CPU).

The display part has a display area to which a plurality of cells are assigned lengthwise and breadthwise, and displays at least two kinds of puzzle elements in the cells. The puzzle element type storing means stores the data on the types of puzzle elements in correspondence with the cell in which the puzzle elements are displayed. The operating means designates at least the puzzle element displayed in the display part. The display controlling means allows a puzzle element of any kind in each of the cells based on the storage state of the puzzle element type storing means. The puzzle element changing means changes the type data in correspondence with each of the puzzle elements consecutively designated through the operating means from the designation start position to the designation end point, in such a manner as to turn the current kind into a different one. The determining means determines whether or not the type data of the puzzle elements changed by the puzzle element changing means satisfies a predetermined requirement.

More specifically, when the start of a game has been designated, at least two kinds of puzzle elements are displayed in the cells provided in the display part. The types of the puzzle elements are stored in the puzzle element type storing means and, based on the storage state of the puzzle element type storing means, the puzzle elements are displayed in the cells on the display part. The puzzle element changing means changes the type data in correspondence with each of the puzzle elements consecutively designated through the operating means from the designation start position to the designation end point, in such a manner as to turn the current kind into a different one. For example, the kind of the puzzle element designated in the manner of one-stroke drawing is changed. The determining means determines whether or not the type data of the puzzle elements changed by the puzzle element changing means satisfies a predetermined requirement.

Thus, as in the case of claim 1, it is possible to enjoy a novel puzzle game requiring a high-level thinking faculty as well as good reflexes and high reaction speed, which makes it possible to designate puzzle elements to be changed in the manner of one-stroke drawing when the puzzle elements are in a resting state.

In one aspect, the present invention further comprises a type rewriting means for rewriting the storage state of the puzzle element type storing means in such a manner as to erase the puzzle elements determined by the determining means to satisfy a predetermined requirement, and an all-erased determining means for determining whether or not all the puzzle elements are erased on the basis of the storage state of the puzzle element type storing means. This allows the player to erase puzzle elements and also feel great satisfaction when he/she has successfully erased all the puzzle elements at a time.

In one embodiment, the puzzle element changing means changes the type data of a plurality of puzzle elements consecutively designated by the operating means in the manner of one-stroke drawing, so that the current kind is turned into a different one. As a consequence, it is possible to designate puzzle elements to be changed in the manner of one-stroke drawing and thus enjoy an innovative puzzle game requiring a high-level thinking faculty as well as good reflexes and high reaction speed, as in the case of the above mentioned present invention.

In another embodiment, the puzzle element changing means changes the type data of a plurality of puzzle elements designated through the operating means in such a manner that the designated route becomes continuous, thereby turning the current kind into a different one. Accordingly, it is possible to designate puzzle elements to be changed in a consecutive manner, not limited to with one stroke, and thus to enjoy an innovative puzzle game requiring a high-level thinking faculty as well as good reflexes and high reaction speed, as in the case of the above mentioned present invention.

In another aspect, the present invention further comprises a passable area display controlling means for displaying a passable area around the display area. The operating means allows the designation of the passable area. The puzzle element changing means, even if there exists any passable area on the route designated through the operating means, concludes that the designated route is continuous. This makes it possible to, as in the case of claim 2, even if there exists no puzzle element to be changed along the direction of the movement, designate the puzzle elements bypassing the passable area, increase the number of consecutively designable puzzle elements and erase the puzzle elements with a small number of strokes.

In still another aspect, the present invention further comprises an initial screen data storing means for storing initial screen data for displaying puzzle elements in the cells at the start of the game, and a writing means for, in response to the designation of the start of the game, writing the initial screen data stored in the initial screen data storing means into a corresponding storage area in the puzzle element type storing means. For example, by storing a plurality of pieces of initial screen data in advance, it is possible to display the initial screen selectively depending on the player's level. This allows the player to enjoy the puzzle game according to his/her level.

In one embodiment, the operating means includes a coordinate designating means for designating the coordinate position of the display area in the display part. The puzzle element changing means changes the type data corresponding to each of the puzzle elements existing on the route from the start-point position to the end-point position designated by the coordinate designating means in such a manner as to turn the current kind into a different one. For example, such a pointing device as a touch panel can be employed as coordinate designating means. Thus, the player can enjoy the puzzle game by designating desired puzzle elements in an easy manner.

In another embodiment, the puzzle element includes a special puzzle element. The determining means, on the assumption that a puzzle element with respect to the cell corresponding to the special puzzle element would satisfy a predetermined requirement based on the type data of the puzzle element changed by the puzzle element changing means, determines whether or not the type data of the puzzle element changed by the puzzle element changing means satisfies the predetermined requirement. For example, the specific puzzle element, when a predetermined requirement that the other puzzle elements in the same line are identical in kind is satisfied, is assumed to be identical in kind to the other puzzle elements and erased together with the other puzzle elements. This makes it possible to change the difficulty level of the game and thus prevent the player from losing interest in playing the game.

In another aspect, the present invention further comprises a type rewriting means for rewriting the storage state of the puzzle element type storing means in such a manner as to erase the puzzle elements determined by the determining means to satisfy a predetermined requirement, and a puzzle element movement controlling means for, when the puzzle element determined by the determining means to satisfy the predetermined requirement has been erased, changing the storage state of the puzzle element type storing means in such a manner that at least a puzzle element displayed adjacent to the erased puzzle element is moved to the cell at an end of the display area or to the cell adjacent to another puzzle element. More specifically, the puzzle element moving means, when the puzzle element satisfying the predetermined requirement has been erased, changes the storage state of the puzzle element type storing means in such a manner that at least a puzzle element displayed adjacent to the erased puzzle element is moved to the cell at an end of the display area or to the cell adjacent to another puzzle element. For example, the puzzle element positioned immediately above the erased puzzle element comes down. Alternatively, the puzzle element may be moved from left to right or from right to left. Therefore, this puzzle game is to be played by designating a puzzle element at a standstill with consideration given to the state of the puzzle element after its movement, which requires the player of a higher-level thinking faculty. Thus, even advanced-level game players can enjoy this game.

In still another aspect, the present invention provides two kinds of puzzle elements, and further comprises an initial state storage controlling means for storing in the initial state storing means the type data of puzzle elements displayed in a plurality of cells and satisfying a predetermined requirement, a cell selecting means for selecting at least two consecutive cells, a type changing means for changing the type data of the cell selected by the cell selecting means or the cell not selected by the cell selecting means which is stored in the initial state storing means, in such a manner as to indicate a puzzle element of the other kind. The type data changed by the type changing means, which is stored in the initial state storing means, is taken as data in the puzzle element storing means at the start of the game. More specifically, two kinds of puzzle elements are available. The initial state storage controlling means stores in the initial state storing means the type data of all the puzzle elements displayed in a plurality of cells and satisfying the predetermined requirement. For example, if the puzzle elements displayed in all the cells are of the same kind, the predetermined requirement is satisfied. The cell selecting means selects at least two consecutive cells at random. The type changing means changes the type data of a puzzle element corresponding to the selected cell into the type data indicative of the other kind. Otherwise, the type changing means changes the type data of a puzzle element corresponding to a not selected cell into the type data indicative of the other kind. The type data changed as stated above is used as data in the puzzle element type storing means at the start of the game, thereby displaying the initial screen. In this manner, the initial screen prepared at random may be used to play the puzzle game. That is, the initial screen of the puzzle game (question) can be prepared at random, which makes it possible to prevent the player from getting tired of playing the game.

In one embodiment, the cell selecting means includes a start-point deciding means for deciding a cell as a start point at random, and a next cell selecting means for selecting a cell adjacent to the previously decided cell, as next cell at random. This makes it possible to prepare the initial screen at random and thus prevent the player from getting tired of playing the game.

In another embodiment, the cell selecting means does not select an already selected cell as next cell. This makes it possible to prepare the initial screen of the puzzle game in which puzzle elements are to be designated in the manner of one-stroke drawing.

In further another aspect, the present invention further comprises a selection end deciding means for deciding at random whether or not to select a next cell, and an end-point position deciding means for, when the selection end deciding means has decided not to select the next cell, deciding the last selected cell as the end-point cell. This makes it possible to, in preparing the initial screen of the puzzle game in which puzzle elements are to be designated in the manner of one-stroke drawing, for example, change at random the number of puzzle elements to be designated. Thus, it is also possible to change the difficulty level of the puzzle game in preparing the initial screen at random.

In a storage medium storing a puzzle element display game program according to the present invention, in a game apparatus that includes a display area to which a plurality of cells are assigned lengthwise and breadthwise, is provided in relation thereto with a display part (a crystal liquid display part on the touch panel side) for displaying puzzle elements in the plurality of cells in the display area, and comprises an operating means, a computer, a puzzle element type storing means (RAM) storing type data of at least one of two kinds of puzzle elements in correspondence with the plurality of cells in the display area, and a moving route data storing means (RAM) for temporarily storing data on a moving route from the designation of start-point coordinates to the designation of end-point coordinates, the puzzle element display game program allows the computer to execute an initial screen data generating step, a first writing step, a first puzzle element displaying step, a passing area displaying step, a second writing step, a third writing step, a second puzzle element displaying step, a display state determining step, and a rewriting step.

More specifically, in the initial screen data generating step, the puzzle element type data is generated for displaying in the display area at least one of two kinds of puzzle elements as at least a screenful of initial screen data. In the first writing step, in response to the designation of the start of game through manipulation of the operating means, the screenful of initial screen data stored in the initial screen data storing means is written into a corresponding storage area in the puzzle element type storing means. In the first puzzle element displaying step, puzzle elements by kind are displayed in the display area according to the storage state of the puzzle element type storing means. In the second writing step, data on the moving route from the designation of start-point coordinates to the designation of end-point coordinates is written into the moving route data storing means according to the manipulation of the operating means. In the third writing step, after the designation of the end-point coordinates, the type data on the puzzle elements changed in kind is written into a storage area in the puzzle element type storing means corresponding to the puzzle elements on the moving route, based on the moving route data stored in the moving route data storing means and the storage state of the puzzle element type storing means. In the second puzzle element displaying step, the puzzle elements by kind are displayed in the display area according to the storage state of the puzzle element type storing means after the change. In the display state determining step, after the change of the puzzle elements, it is determined whether or not the puzzle elements have entered a predetermined display state, based on the puzzle element type data stored in the puzzle element type storing means. In the rewriting step, the storage state of the puzzle element type storing means is rewritten so as to erase the puzzle elements in the predetermined display state.

This makes it possible to obtain a puzzle element display game program that has the same advantages as those of the above mentioned puzzle element display game apparatus.

In one embodiment, passing area display data is generated for displaying a passable area around the display area in the initial screen data generating step. Also, a passing area displaying step is executed for displaying a passable area around the display area based on the passing area displaying data. In addition, in the second writing step, data indicative of the positions of the puzzle elements and passing area designated as moving route data is written into the moving route data storing means. This makes it possible to, as in the case of the above described puzzle element display game apparatus, even if there exists no puzzle element to be changed along the direction of movement, designate puzzle elements bypassing the passable area, increase the number of consecutively designable puzzle elements and erase the puzzle elements with a small number of strokes.

In a storage medium storing another puzzle element display game program according to the present invention, in a game apparatus that includes a display area to which a plurality of cells are assigned lengthwise and breadthwise, is provided in relation thereto with a display part (a crystal liquid display part on the touch panel side) for displaying puzzle elements in the plurality of cells in the display area, and comprises an operating means, a computer, a puzzle element type storing means (RAM) storing type data on at least one of two kinds of puzzle elements in correspondence with the plurality of cells in the display area, and a moving route data storing means (RAM) for temporarily storing data on a moving route from the designation of start-point coordinates to the designation of end-point coordinates, the puzzle element display game program allows the computer to execute an initial screen data generating step, a first writing step, a first puzzle element displaying step, a passing area displaying step, a second writing step, a third writing step, a second puzzle element displaying step, a display state determining step, and a rewriting step.

More specifically, in the initial screen data generating step, the puzzle element type data for displaying in the display area at least one of two kinds of puzzle elements and data for displaying a passable area are generated as at least a screenful of initial screen data. In the first writing step, in response to the designation of the start of the game through manipulation of the operating means, the screenful of initial screen data stored in the initial screen data storing means is written into a corresponding storage area in the puzzle element type storing means. In the first puzzle element displaying step, puzzle elements by kind are displayed in the display area according to the storage state of the puzzle element type storing means. In the passing area displaying step, a passable area is displayed around the display area, based on the passing area displaying data. In the second writing step, data on a moving route from the designation of start-point coordinates to the designation of end-point coordinates is written into the moving route data storing means according to the manipulation of the operating means. In the third writing step, after the designation of the end-point coordinates, the type data of the puzzle elements changed in kind is written into a storage means in the puzzle element type storing means corresponding to the individual puzzle elements on the moving route, based on the moving route data stored in the moving route data storing means and the storage state of the puzzle element type storing means. In the second puzzle element displaying step, the puzzle elements by kind are displayed in the display area according to the storage state of the puzzle element type storing means after the change. In the display state determining step, after the change of the puzzle elements, it is determined whether or not the puzzle elements have entered a predetermined display state, based on the puzzle element type data stored in the puzzle element type storing means. In the rewriting step, the storage state of the puzzle element type storing means is rewritten so as to erase the puzzle elements in the predetermined display state.

This makes it possible to obtain a puzzle element display game program that allows the player to enjoy a novel and innovative puzzle game requiring a high-level thinking faculty as well as good reflexes and high reaction speed, by designating puzzle elements to be changed in the manner of one-stroke drawing when the puzzle elements are in a resting state.

In one embodiment, the second writing step includes a continuous state determining step of determining whether or not the moving route from the designation of the start-point coordinates to the designation of the end-point coordinates is designated so as to be continuous according to the manipulation of the operating means. When the moving route is concluded to be continuous, the moving route data is written into the moving route data storing means. Thus, as in the case of the present invention of the above described puzzle element display game apparatus, it is possible to, even if there exists no puzzle element to be changed along the direction of the movement, designate puzzle elements bypassing the passable area, increase the number of consecutively designable puzzle elements and erase the puzzle elements with a small number of strokes.

In another embodiment, the second writing step includes a writing operation prohibiting step for, in writing the moving route data from the designation of the start-point coordinates to the designation of the end-point coordinates into the moving route data storing means, when the moving route with the same coordinate positions is redundantly designated, prohibiting the writing operation for changing the puzzle element type. As in the case of the present invention of the above described puzzle element display game apparatus, this embodiment requires a high-level thinking faculty as well as good reflexes and high reaction speed, and has specific advantages that make it possible to designate puzzle elements to be changed in the manner of one-stroke drawing when the puzzle elements are in a resting state and, even if there exists no puzzle element to be changed along the direction of movement, designate puzzle elements bypassing the passable area, increase the number of continuously designable puzzle elements and erase the puzzle elements with a small number of strokes.

In still another embodiment, the second writing step, the third writing step, the second puzzle element displaying step, the predetermined state determining step, the rewriting step are repeatedly executed each time the start-point coordinates are designated and then the end-point coordinates are designated through manipulation of the operating means.

In further another embodiment, the display part is a liquid crystal display, the game apparatus is a hand-held game machine including a housing with the liquid crystal display on its main surface, and the operating means is composed of a touch panel attached to the surface of the liquid crystal display. Also, the second writing step includes a moving route detecting step of detecting a continuous moving route from the designation of the start-point coordinates to the designation of the end-point coordinates through manipulation of the touch panel, out of the plurality of puzzle elements displayed on the liquid display and a writing step of writing the detected data on the moving route into the moving route data storing means. This makes it possible to pass through the movable area even when there exists no puzzle element of to be changed in type along the direction of the movement in the puzzle element display area, lengthen the moving route from the start point to the end point (one-stroke route or shape) without any interruption in the continuous moving route and erase a screenful of puzzle elements with a small number of strokes or a single stroke, thereby allowing the player to feel great gratification.

In a storage medium storing still another puzzle element display game program according to the present invention, the puzzle element display game program allows a processor of a game apparatus that has a display area to which a plurality of cells are assigned lengthwise and breadthwise and comprises a display part for displaying at least two kinds of puzzle elements in the cells in the display area, a puzzle element type storing means for storing puzzle element type data in correspondence with the cells in which the puzzle elements are displayed, and an operating means for designating at least the puzzle elements displayed in the display part, to execute a display controlling step, a puzzle element changing step, and a determining step. In the display controlling step, some kind of puzzle element is displayed in the cell based on the storage state of the puzzle element type storing means. In the puzzle element changing step, the type data corresponding to each of the puzzle elements consecutively designated from a designation start position to a designation end position is changed so that the current kind is turned into a different one. In the determining step, it is determined whether the type data of the puzzle elements changed in the puzzle element changing step satisfies a predetermined requirement or not.

As in the case of the above mentioned present inventions of puzzle element display game apparatus, this makes it possible to designate puzzle elements to be changed in the manner of one-stroke drawing when the puzzle elements are in a resting state, which allows the player to enjoy an innovative puzzle game requiring a high-level thinking faculty as well as good reflexes and high reaction speed. In this manner, it is possible to obtain a puzzle element display game apparatus and a storage medium storing a puzzle element display game program that allow the player to enjoy a novel and innovative puzzle game requiring a high-level thinking faculty as well as good reflexes and high reaction speed, by designating puzzle elements to be changed in the manner of one-stroke drawing.

It is also possible to offer a high degree of flexibility in selecting a puzzle element capable of being changed by the player's operation, out of a plurality of puzzle elements at a standstill within the display area, and to perform game operations and display state changes in various manners, thereby allowing the player to feel interest in game operations and display states.

Additionally, the display state of blocks at rest is capable of being changed. This brings about specific advantages that it is possible to provide a variety of operating manners and display states and thus prevent the player from getting tired of playing the game.

Moreover, by configuring the passable route so as to be displayed around the display area, even if there exists no puzzle element to be changed along the direction of movement, it is possible to designate puzzle elements bypassing the passable area, increase the number of consecutively designable puzzle elements and erase the puzzle elements with a small number of strokes.

Furthermore, it is possible for the player to designate a plurality of puzzle elements displayed in the display area directly from the touch panel, not by the medium of the cursor or the direction designating switch, thereby offering the convenience of operation.

The technical theory of the present invention applies to software games for video game machines and hand-held game machines and also to software games for personal computers. The following description is intended for the case where the present invention applies to a hand-held game machine. It is to be noted that the present invention is not limited to the games for hand-held game machine of the embodiments.

The above described features, aspects and advantages will become more apparent from the following detailed description when taken in conjunction with the accompanying drawings.

BRIEF DESCRIPTION OF THE DRAWINGS

FIG. 13 is an illustrative view showing an example of an initial screen in a puzzle element display game of a second embodiment and panel numbers corresponding to the initial screen;

FIG. 15 is an illustrative view showing another example of display state transition in the puzzle element display game of the second embodiment;

FIG. 20 is an illustrative view showing an image of an initial screen for question preparation and an image of a screen for deciding a start-point position in the third embodiment;

FIG. 21 is an illustrative view showing an image of a screen in which a next cell is decided at random from the start-point position and an image of a screen in which a one-stroke answer is decided at random in the third embodiment;

DETAILED DESCRIPTION

First Embodiment

Figure 1:
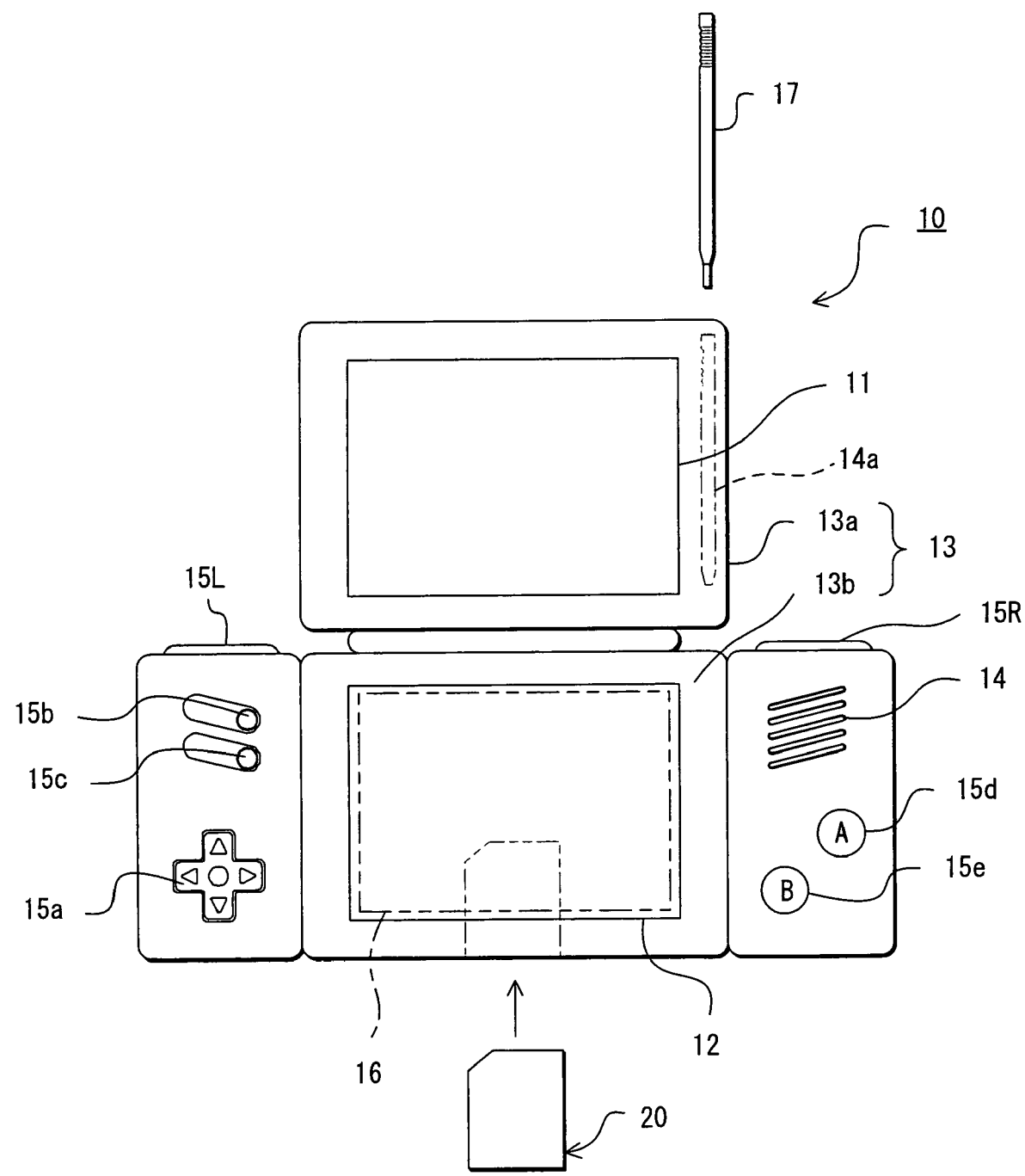
FIG. 1 is an outline view of a hand-held game machine of one embodiment of the puzzle element display game apparatus.

FIG. 1 is an outline view of a hand-held game machine of one embodiment of the puzzle element display game apparatus of the present invention. In FIG. 1, the hand-held game machine 10 of this embodiment is stored in a housing 13 in such a manner that two crystal liquid displays (hereinafter referred to as "LCD") 11 and 12 are arranged in predetermined positions. More specifically, if the game machine is housed so as to arrange vertically the first LCD 11 and the second LCD 12, the housing 13 is formed from an upper housing 13a and a lower housing 13b, and the upper housing 13a is held in a freely rotatable manner (a freely foldable manner) at a part of the top side of the lower housing 13b. The upper housing 13a has a flat shape a little larger in size than a flat shape of the first LCD 11, and is provided with an opening in such a manner that a display surface of the LCD 11 is exposed to outside from one main surface thereof. The lower housing 13b has a flat shape longer sideways than the upper housing 13a, is provided with an opening at an approximately middle part breadthwise thereof in such a manner that a display surface of the LCD 12 is exposed to outside. The lower housing 13b is provided with a sound release hole 14b on either one of the sides of the LCD 12, and an operating switch part 15 attached to the both sides of the LCD 12.

The operating switch part 15 includes a direction designating switch 15a, a start switch 15b and a select switch 15c attached to one main surface of the lower housing 13b at the left side of the LCD 12, and action switches 15d and 15e attached to one main surface of the lower housing 13b at the right side of the LCD 12. The direction designating switch 15a is used for designating a movement direction of a cursor capable of being operated by the player, etc. The action switches 15d and 15e are used for carrying out actions other than direction designation, for example, designating a start point or an end point. Also, as required, it is possible to add more action switches or provide side switches 15L and 15R to the upper sides of the lower housing 13b to which the operating switch part 15 is attached.

Figure 2:
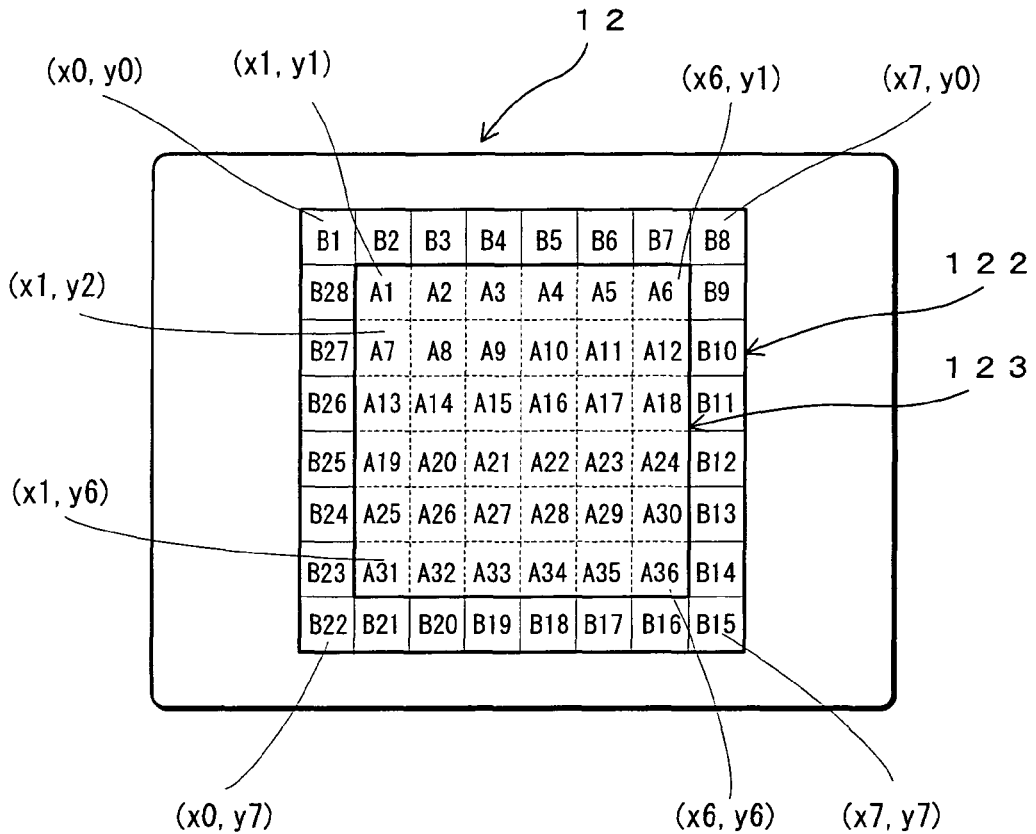
FIG. 2 is an illustrative view showing a display area for displaying a plurality of puzzle elements and a passable area.

Additionally, as shown in FIG. 2, the LCD 12 displays a plurality of puzzle elements in a puzzle element display area 121 smaller in size than its maximum displayable range, and also displays a passable area 122 on the periphery thereof. More specifically, the display area 121 (an inner area delimited by a display frame 123) is allocated to a plurality of lengthwise and breadthwise cells (6 lengthwise×6 breadthwise in the shown example) or to small panels A1 to A36, displays a puzzle element in each of the cells. The cells in the display area 121 are identified by the cell numbers or panel numbers A1 to A36 or identified by coordinate data (for example, A1=x1, y1, . . . A6=x6, y1, A7=x1, y2, . . . A36=x6, y6). Also, the cells assigned to the display area 121 display at least one of two kinds of puzzle elements. In the case of two kinds of puzzle elements, for example, puzzle element 124w and 124b of two colors (white and black) (see FIG. 6 described later) are displayed. If one kind of puzzle element is designated in the manner of one-stroke drawing, it is changed (inversed) into the other kind of puzzle element. In addition, the passable area 122 is formed so as to surround the periphery (or the outer region) of the display area 121 by one cell or panel. The panels in the passable area 122 are identified by numbers B1 to B28 in clockwise order from the upper left one or identified by coordinate data (B1=x0, y0, . . . B8=x7, y0, . . . B15=x7, y7, . . . B22=x0, y7, . . . B28=x0, y1), for example. However, the panels in the passable area 122 constitute a passing route at the designation of puzzle elements and thus are not changed in display state even by coordinate designation. This allows the puzzle elements in the display area 121 and the cells (panels) in the passable area 122 to be identified by numbers or coordinate data.

The panels are provided in the passable area 122 because, in the case where there exists no puzzle element to be changed (inverted) along the movement direction of the cursor, if continuously moving the cursor, the player will have to select even not-to-be-changed puzzle element(s) against his/her will, and thus the passable area is prepared so that it can be used as a roundabout moving route. This eliminates the need for selecting undesired puzzle element(s) and makes it possible to select consecutive puzzle elements with a small number of strokes. This allows the player to work out his/her strategy in selecting an appropriate movement direction of the cursor so as to erase puzzle elements with a small number of strokes, thereby further enhancing the strategic and fascinating properties of the game. Also, it is possible to raise substantially the degree of flexibility in selecting the movement direction.

Besides, as an example of a variation of display manner of puzzle elements, the puzzle element types may be changed by design, pattern or symbol, instead of by color. In addition, the number of puzzle elements capable of being displayed in the display area 121 (or the number of assigned cells) may be set according to the game program (for example, 5 to 10 lengthwise×5 to 10 breadthwise) so as to be changeable according to the difficulty level of the game. Moreover, the number of the kinds of puzzle elements are not limited to two and may be three or more. In the case of three kinds of white, black and red, for example, the kinds of the puzzle elements may be changed in order based on a predetermined rule each time the puzzle element of each kind is designated (for example, the puzzle element is changed into black by designation of white, changed into red by designation of black and changed into white by designation of red). In this case, as a matter of course, the more the number of lengthwise and breadthwise puzzle elements increases and/or the more the number of puzzle elements increases, the higher the difficulty level of the game becomes. The number of kinds of puzzle elements, the display manners of puzzle elements, the maximum number of puzzle elements capable of being displayed in the display area (the number of lengthwise and breadthwise cells) are decided by the settings in the program.

Referring to FIG. 1 again, a touch panel 16 is preferably attached on a top surface of the LCD 12. The touch panel 16 may be of any one of a resistance film system, an optical system (infrared rays system) and an electrostatic capacitive coupling system, for example. When a depressing, dragging or patting operation is performed on the top surface of the touch panel 22 with a stick 24 (or a finger), the touch panel 22 detects the coordinate position of the stick 24 and outputs the coordinate data. The touch panel 16 makes it possible to directly designate puzzle elements to be displayed in the puzzle display area 121 on the screen of the LCD 12 with the stick 24 or the finger. Also, the touch panel 16 may be used for selecting and operating icons displayed on the LCD 12 and for designating coordinates, etc.

As stated above, the hand-held game machine 10 has liquid crystal displays 11 and 12 as a liquid crystal display part for two screens and the touch panel 16 is provided to the surface of one of the LCDs (the LCD 12 as lower screen, for example), thereby providing a structure having the two screens LCD 11 and LCD 12 and the two operating parts (15 and 16). In this case, the touch panel 16 is used for performing input operations different from those with the operating switch 15 or the same input operations as those with the operating switch 15.

A storage hole 14a is formed as required on the vicinity of one side of the upper housing 13a. The storage hole 14a is a hole for storing the stick 17 for inputting a coordinate position on the touch panel 16, and is selected so as to be approximately the same as the stick 17 in outside dimensions. Formed in a part of one side of the lower housing 13b is a card insertion part (not illustrated) for detachably inserting a game card (or a game cartridge) 20 with a built-in memory (ROM, etc.) storing a game program. A connector (not illustrated) for electrical connection with the game card 20 is contained inside the card insertion part. Moreover, stored in the lower housing 13b (or the upper housing 13a) is an electronic circuit board (30 as shown in Figure described later) on which various electronic components such as a CPU are packaged. Besides, the storage medium for storing a game program is not limited to a nonvolatile semiconductor memory such as ROM and flash memory, and may be an optical disc storage medium such as CD-ROM and DVD.

Figure 3:
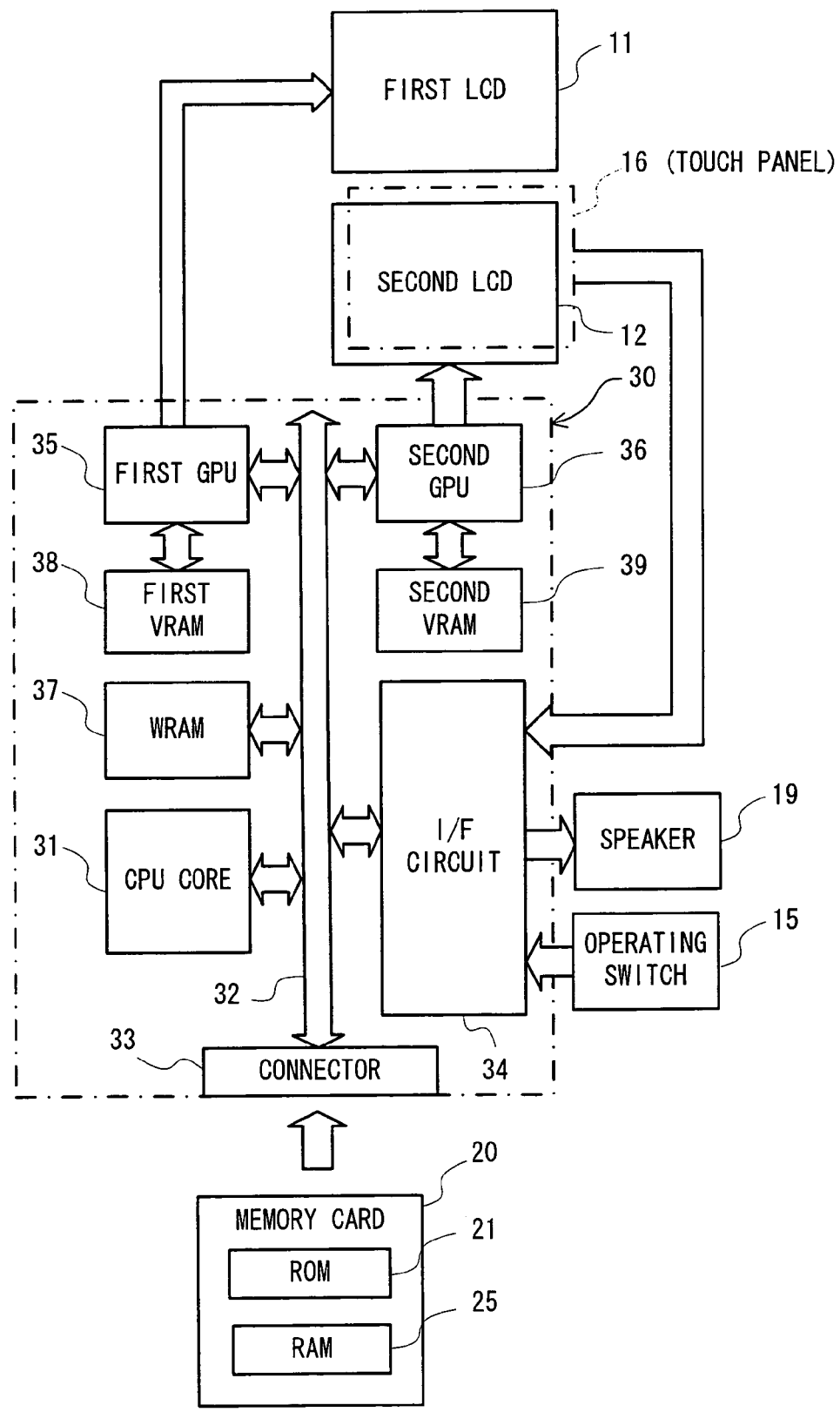
FIG. 3 is a block diagram of a hand-held game machine of one embodiment.

FIG. 3 is a block diagram of a hand-held game machine of one embodiment of the present invention. In FIG. 3, a CPU core 31 is implemented on the electronic circuit board 30 stored in the housing 13. The CPU core 31 is connected with a connector 33 via a bus 32, and also connected with an input/output interface (I/F) circuit 34, a first graphic processing unit (first GPU) 35, a second graphic processing unit (second GPU) 36 and a working RAM (hereinafter referred to as "W-RAM") 37. The connector 33 is connected with the memory card 20 in a detachable manner. The memory card 20 contains a ROM 21 and an S-RAM 25. The S-RAM 25, when removed from the hand-held game machine 10, draws backup power from a button battery (not illustrated) for preventing its stored data from being damaged due to the stoppage of power supply. The ROM 21 is read by the CPU core 31, and the S-RAM is written and/or read by the CPU core 31. The I/F circuit 34 is connected with the operating switch part 15 and the touch panel 16, and also connected with a speaker 18. The speaker 18 is arranged inside a sound release hole 14b. The first GPU 35 is connected with a first video RAM 38, and the second GPU 36 is connected with a second video RAM (hereinafter referred to as "V-RAM") 39.

Figure 4:
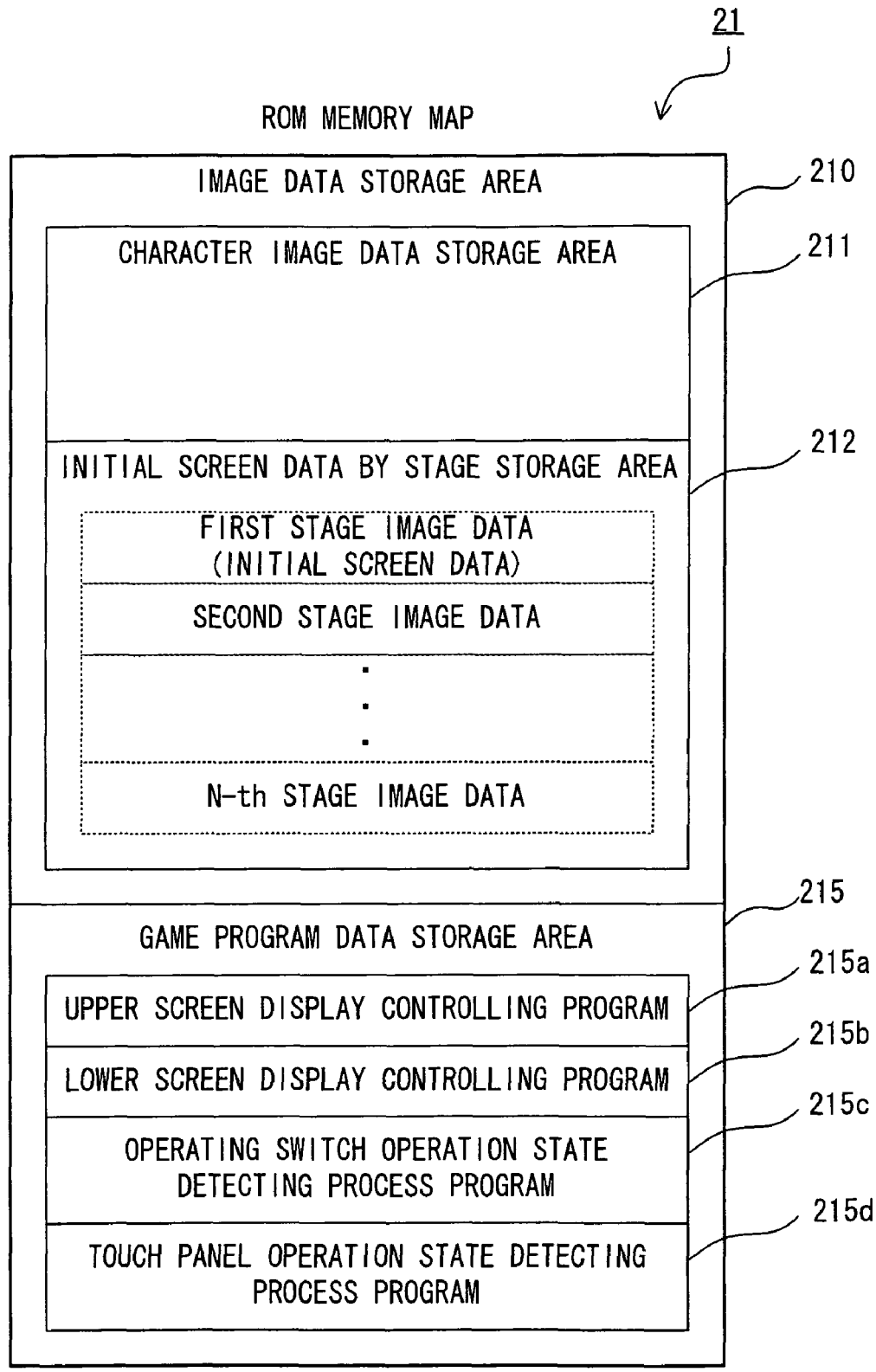
FIG. 4 is memory stages illustrating storage areas in a ROM 21.

FIG. 4 is a memory map illustrating data stored in the ROM 21. In FIG. 4, the ROM 21 is roughly classified into a storage area 210 and a storage area 215. The storage area 210 is a storage area for storing image data, and includes storage areas 211 and 212. The storage area 211 is a storage area for storing 1 character image data (character image data storage area), and stores, for example, panels (puzzle elements) indicative of puzzle element designs by kind, panels in a passing area, panels with designs indicative of the state in which puzzle elements are being erased, cursor marks, and other kinds of dot data of designs for various characters required for the game. The storage area 212 is a storage area (initial screen data by stage storage area) for storing pattern data indicative of display state of puzzle elements in an initial screen (start screen) at each stage (or phase). The storage area 212 stores, for example, the kind data (design, color or the like) of puzzle elements to be displayed in correspondence with the individual cells in the display area 121 shown in FIG. 2.

Moreover, in this embodiment, the lower LCD 12 displays puzzle elements designated directly or indirectly by the player. Alternatively, in order to provide the player with, as a hint, a pattern of puzzle elements to be displayed with next timing, the LCD 11 may display an initial screen pattern immediately before the LCD 12 displays it in the display area 121. For that purpose, a display control program for the upper screen is stored in a storage area 215a described later.

The storage area 215 is a storage area for storing a game program, and includes storage areas 215a to 215d. The storage area 215a stores the display control program for the upper screen. The storage area 215b stores a display control program for the lower screen. The storage area 215c stores an operating switch operation state detecting process program. The operating switch operation state detecting process program is a program for detecting the designation of a direction among up, down, left and right through the direction designating switch 15a and detecting the amount of movement by duration of time of the direction designation, and also detecting the kind of the operated action switch 15c or 15e, and so forth. The storage area 215d stores a touch panel operation state detecting process program. The touch panel operation state detecting process program is a program for reading and temporarily storing coordinate data that changes with the operation of the touch panel at short predetermined intervals (by frame, for example), detecting the change state of the coordinate data at relatively long predetermined intervals (several tens to hundreds times of frame period), detecting that the touch position remains unchanged if the coordinate data repeatedly stays in the same (or approximately the same) state and, if the coordinate data is gradually and continuously changing, detecting that the direction of a movement is designated based on the amounts of changes in X-axis element and Y-axis element. In addition, the amount of the movement (the amount or distance of a scroll) may be detected on the basis of the amount of a vector in which the amounts of movements of X-axis element and Y-axis element are combined. The details of the processes of programs stored in these storage areas 215a to 215d are described later with reference to FIG. 8 to FIG. 10.

Referring to FIG. 3 again, the CPU core 31 reads initial screen (or start screen) image data (for example, the image data of the lower screen alone or the image data of both the lower screen and the upper screen) of initial screen data for one stage (or map) (for example, one stage number shown in the memory map of the ROM 21 of FIG. 4), based on the program stored in the ROM 21, and transfers it to the W-RAM 37. Additionally, the CPU core 31 reads the program for generating an image of the upper screen from the ROM 21 and provides it to the GPU 36, and reads the program for generating an image of the lower screen from the ROM 21 and provides it to the GPU 35. Accordingly, the GPU 35 reads the W-RAM 37, generates the image data of the upper screen, writes the image data of the upper screen to be displayed on the LCD 11 into the V-RAM 39, and then reads the V-RAM 38 with predetermined timing and displays the image of the upper screen on the LCD 11. In parallel to this, the GPU 36 reads the W-RAM 37, generates the image data of the lower screen, writes the image data of the lower screen to be displayed on the LCD 12 into the V-RAM 39, and then reads the V-RAM 39 with predetermined timing and displays the image of the lower screen on the LCD 12.

Figure 5:
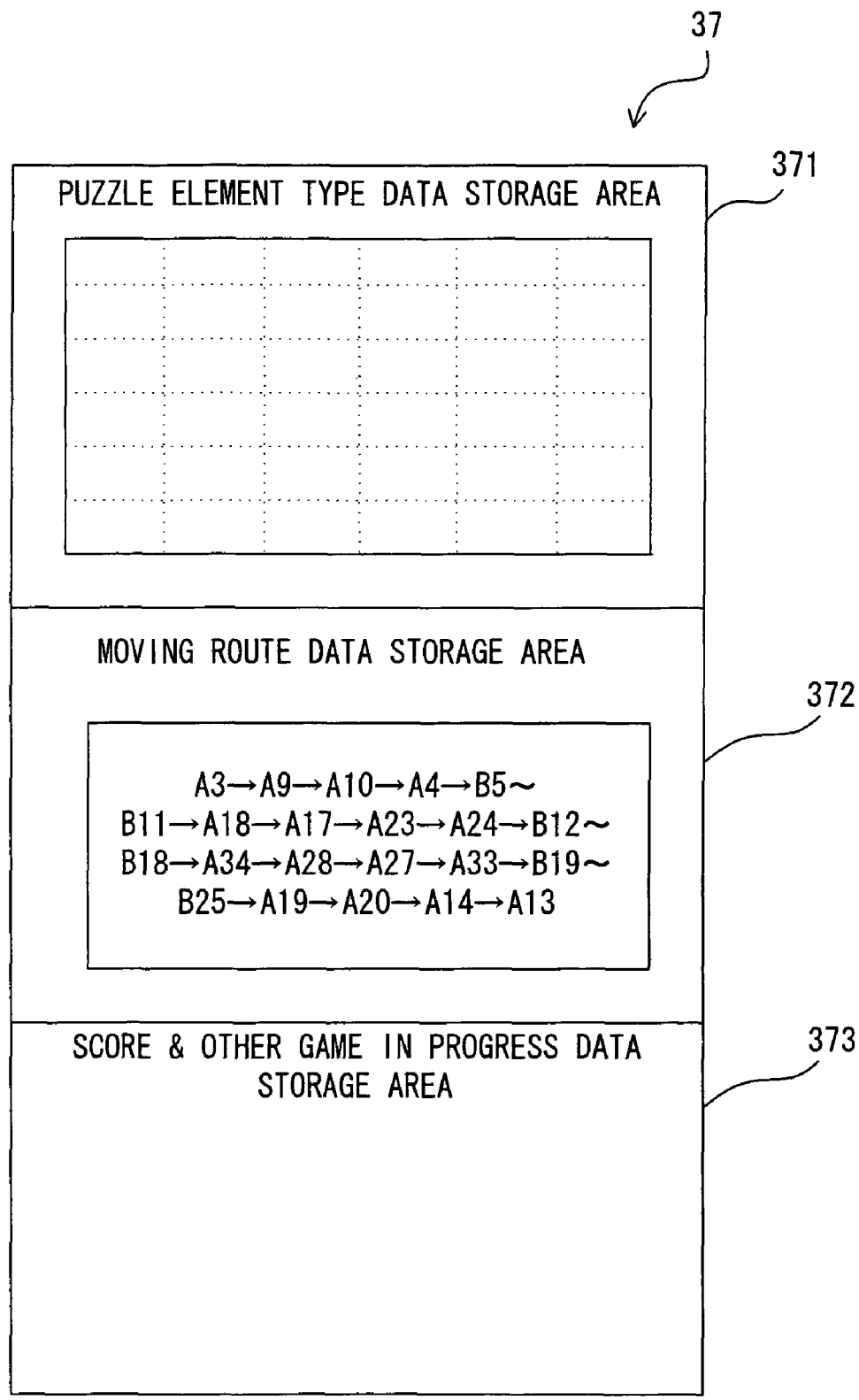
FIG. 5 is a memory map illustrating storage areas in a working RAM 37.

FIG. 5 is a diagram illustrating storage areas in the working RAM 37. The working RAM 37 includes storage areas 371 to 373. The storage area 371 makes it possible to write and read kind (type) data of puzzle elements to be displayed in the lengthwise and breadthwise cells assigned to the display area 121. Prior to the start of the game at each stage, the kind data of puzzle elements in the initial screen is read from the storage area 212 and written into the storage area 371. Each time the player designates the coordinate positions of puzzle elements to be changed or inverted, the storage area 371 updates the previously stored type data under predetermined rules. For example, in the case of the types of puzzle elements of white and black, the type data of the cells as white (or black) stored in the storage area is rewritten as type data of black (or white), and the puzzle elements are displayed in reversed state. When the player designates by turns consecutive puzzle elements to be changed in display state by operating the touch panel 16 or the direction switch 15a, the storage area 372 stores the numbers for the designated puzzle elements, the positions of the cells thereof or coordinate data thereof. In addition, when the player continuously designates a passable area adjacent to the puzzle elements, the storage area 372 also stores the numbers, cells or coordinate data for the passable area.

The storage area 373 is an area for storing backup data such as the numbers for cleared stages and earned scores, and data to be temporarily stored in accordance with the process.

Figure 6:
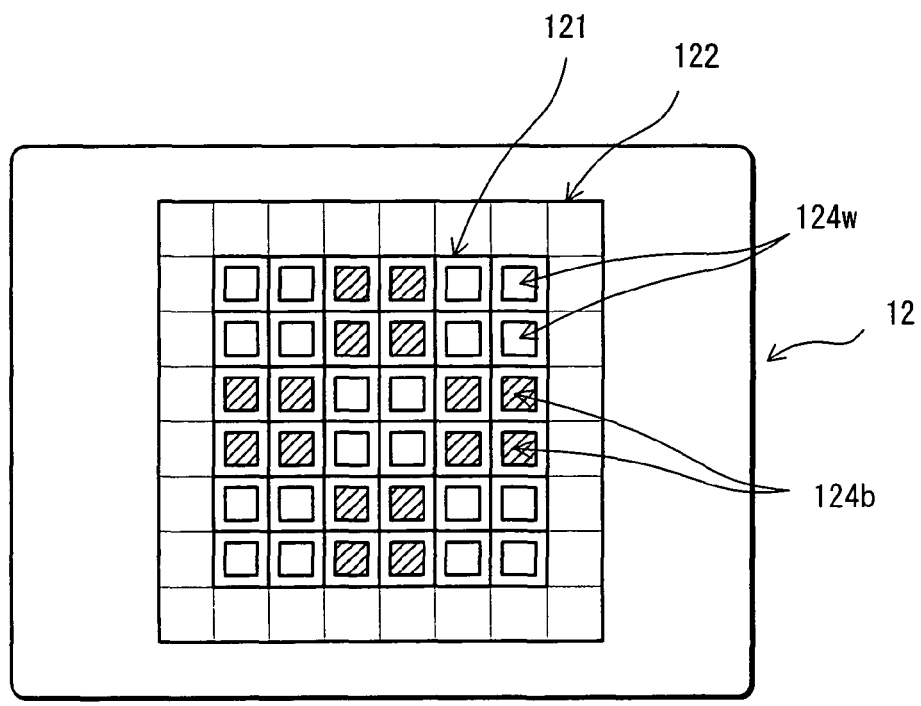
FIG. 6 is a diagram for describing the display state of one example of an initial screen in a puzzle element display game.

FIG. 6 is a diagram showing an example of a puzzle element display pattern (initial screen) at a stage. In this display example, the display area 121 for displaying a plurality of puzzle elements is formed from a 6×6 matrix of cells (the maximum number of displayable puzzle elements is 36), and the passable area 122 is displayed by one cell or panel around the periphery of the display area 121. Also, in the initial screen at the start of the game, the display area 121 displays, out of 3×3 blocks in which four cells each are grouped as one block, puzzle elements 124w of a first kind (for example, white in the case of color) in the cells of the blocks in the four corners and the center, and also displays puzzle elements 124b of a second kind (for example, black in the case of color; these elements are shaded in the figure.) in the remaining cells. The initial screen at the start of the game is configured so as to be different in display pattern according to the stage.

In the puzzle game of the present invention, in order to uniform the kind of puzzle elements in one line by changing (inverting) the kind of some of the puzzle elements, the moving route from start point to end point in one of the upward, downward, rightward and leftward directions is designated by selecting the puzzle element positions with the cursor or the touch panel 16 in such a manner that as many puzzle elements of the kind to be changed (inverted) as possible become consecutive. However, it is not always required to designate consecutive puzzle elements, and it is just preferable that as many consecutive puzzle elements as possible are designated so that the stage of the game can be cleared with a minimum number of strokes. Also, the passable route 122 is not an essential element or panel, and just a factor in designating consecutively a large number of puzzle elements with advantage. In this case, the game offers wide varieties of positions of start points and end points and routes from start points to end points capable of being designated with the cursor or the touch panel 16, and the player uses many patterns of thinking according to that. In addition, with variations in changes of puzzle elements through designation of start point, end point and route between them, it is possible for the player to enjoy a puzzle game requiring a high-level thinking faculty.

As for the number of puzzle elements to be displayed in the display area 121, the numbers of lengthwise and breadthwise cells may be different as required in order to make variations in the difficulty level of the game. Additionally, the example of FIG. 6 shows the case where the passable area 122 is formed around the outer region of the display area 121. If a little increase in the number of strokes is tolerable, the passable area 122 may be omitted. In addition, this example shows the case where the panels in the passable area 122 are consecutively aligned around the outer periphery of the display area 121. Alternatively, in order to make variations in the difficulty level of the game, in the case where there exists no puzzle element to be changed (or inverted) along the direction of movement with one stroke (a one-stroke form after the puzzle element designation), both passable panels and impassable panels may be mixed in the passable area 122 (for example, passable panels may be alternately arranged). Moreover, conceivable game modes include a stage-clearing mode in which a predetermined number of lines of puzzle elements displayed in a display pattern of initial screen at each stage is to be erased with one stroke (or in one move) and an endless mode in which puzzle elements in lines displayed in the initial screen display pattern are continuously falling. In the endless mode, scores are calculated and displayed according to the total number of erased lines and/or the more or less of number of concurrently-erased lines that have been successfully erased with one stroke (or in one move).

Next, referring to FIG. 7, a description of specific operations and overview of flow of the game in a puzzle element display pattern at one stage shown in FIG. 6 are given below. Prior to the start of the game, when a selection is made between a mode in which a desired stage is to be arbitrarily selected in the menu screen or a mode in which some stages are to be sequentially played in predetermined order, the initial screen (start screen) at the selected stage or the first stage in the predetermined order is displayed as shown in FIG. 7A. Since the cursor is not yet in a selected state at that time, a symbol indicative of an unselected state (the mark ●, for example) is displayed here.

The player designates a puzzle element as a start point, for example, A3 in the first line and third column in the first area 121 (see FIG. 2 for the correspondence with cell numbers). More specifically, for an input operation through the direction designating switch 15a, the player points at the puzzle element with the cursor (the frame with ○, for example) and presses the action switch 15d indicative of the selection of the start point. For an input operation through the touch panel 16, the player touches the coordinate position (A3) of the puzzle element. Accordingly, the designated start point is displayed (for example, the frame □ is displayed, the puzzle element blinks, etc.)

Then, as shown in FIG. 7C (the screen of designation in progress) and FIG. 7D (the screen of completed and determined designation), the player operates the direction designating switch 15a or touches the upper surface of the touch panel 16 to move the cursor or the touch pen 17 over the touch panel 16 in such a manner as to designate puzzle elements sequentially in order of puzzle elements A9, A10, A4, panels B5 to B11 in the passable area 122, puzzle elements A18, A17, A23, A24, panels B12 to B18, puzzle elements A34, A28, A27, A33, panels B19 to B25, puzzle elements A19, A20, A14, and A13, as shown with dotted lines. At that time, for indication of the designation, the puzzle elements and panels designated by the cursor in the passable area are fringed in a color different from the colors of types of puzzle elements. Then, the puzzle element A13 at the end point has been reached, the player operates the action switch 15d, or double-clicks on the touch panel 16 and then releases the touch panel 16 (see FIG. 7D). This completes the designation of the end point. Accordingly, the plurality of puzzle elements to be changed (or inverted) are consecutively designated in the manner of one-stroke drawing. At that time, the puzzle elements or the numbers (the above mentioned A3 . . . A13, B5 to B25) or coordinate data for the cells or panels in the passable area 122 from the start point (A3) to the end point (A13) are stored as moving route data in the storage area 372 of the working RAM.

Subsequently, as shown in FIG. 7E (the screen of display state change), the puzzle elements designated for change (inversion) A3, A9, A10, A4, A18, A17, A23, A24, A34, A28, A27, A33, A19, A20, A14 and A13 are displayed in a state of being changed from the original kind (black) to the other kind (white) (for example, they are gradually being changed from black to white). Then, when the process of changing the display state of the designated puzzle elements has been completed, all the puzzle elements in the display frame 123 are turned into the same kind (white), which indicates that the stage is cleared. After that, as shown in FIG. 7F (the erased screen), all the puzzle elements of the same kind are gradually erased.

Figure 7:
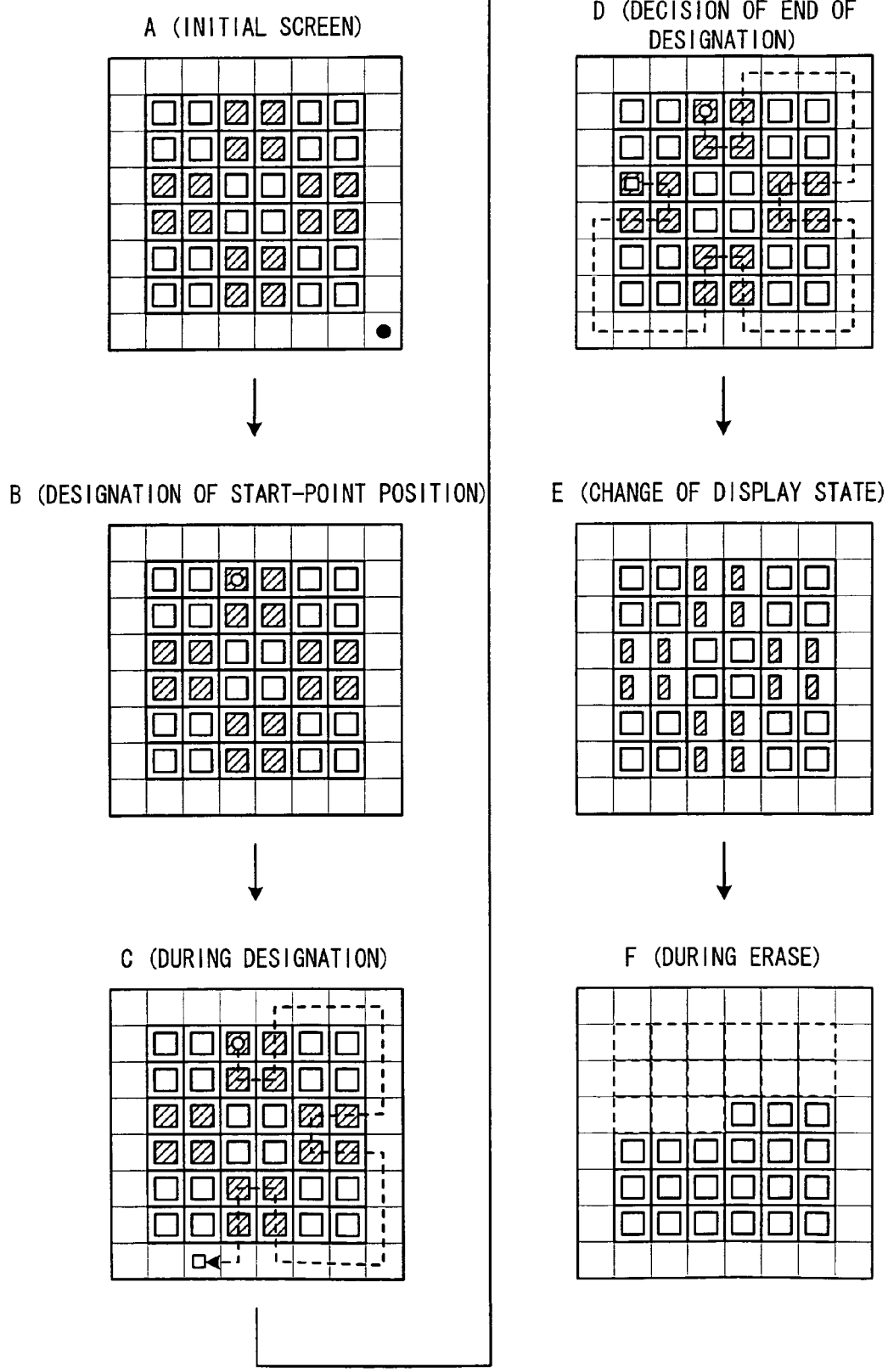
FIG. 7 is a diagram for describing the flow of one example of display state transition in the puzzle element display game.

Besides, the display state transition of FIG. 7 indicates a successful example of uniforming all the puzzle elements in kind with one stroke. If the method of erasing with one stroke is uncertain, it is necessary to uniform all the puzzle elements in kind by repeatedly designating puzzle elements several times. In this case, in the game mode of competition for scores, the number of scores to be given varies depending on with how many strokes the kinds of all the puzzle elements have been unformed (for example, the fewer the strokes is, the higher score is obtained). In addition, the designated puzzle elements may be indicated by changing the color of the designated panels or drawing a line linking the consecutive panels, instead of adding a fringe to the puzzle elements or panels in the passable area.

Figure 8:
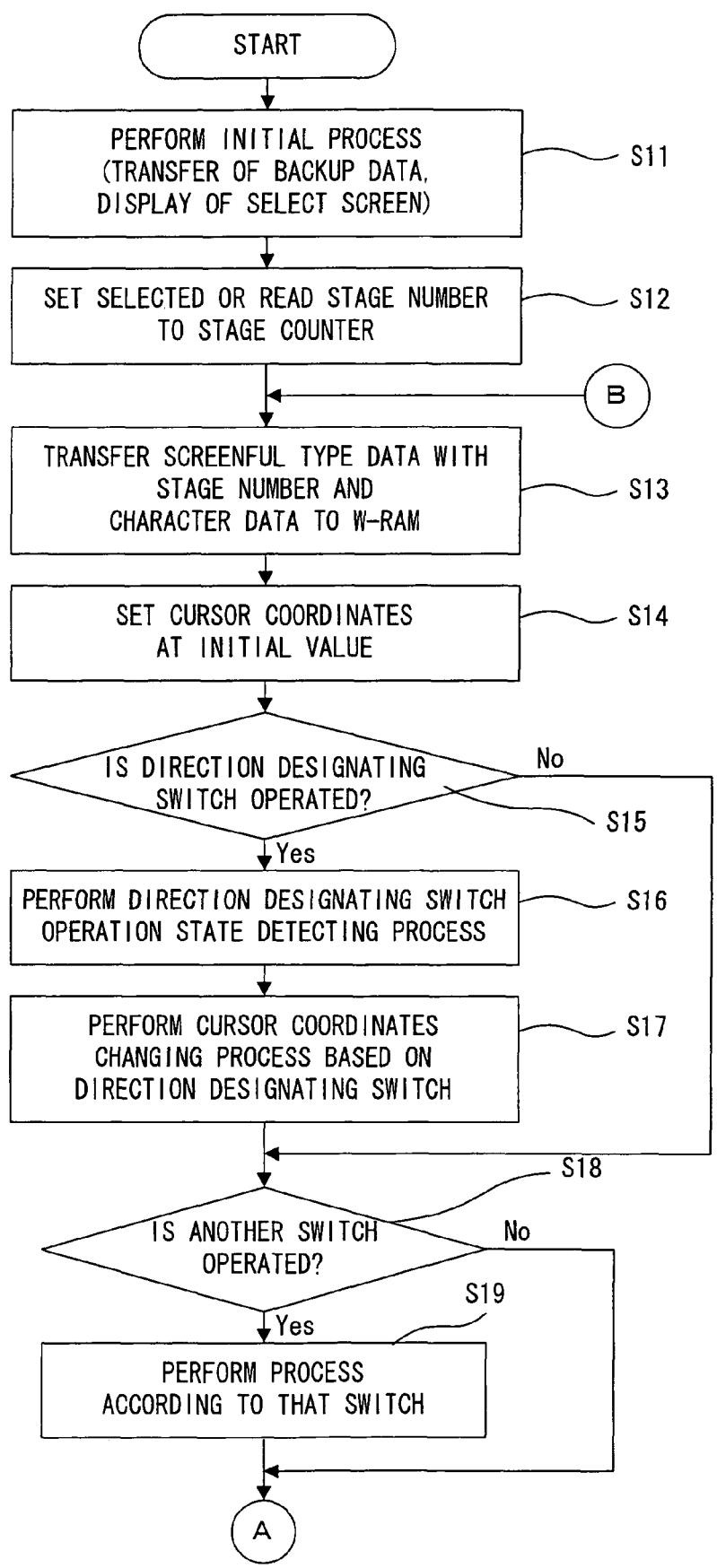
FIG. 8 is a flowchart (first-half part) of a main routine for describing the operation of the puzzle element display game of one embodiment.
Figure 9:
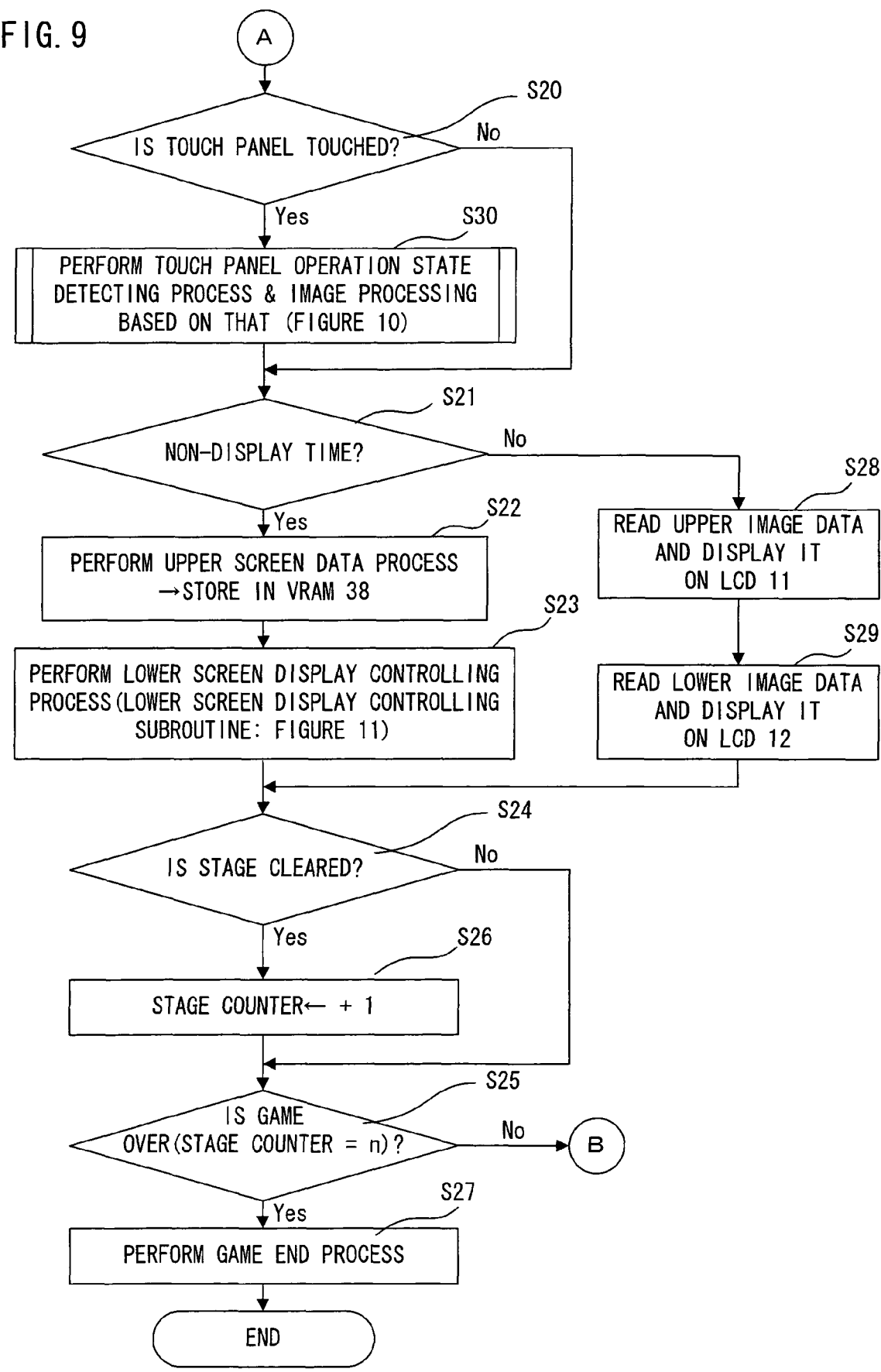
FIG. 9 is a flowchart (second-half part) of the main routine for describing the operation of the puzzle element display game of one embodiment.
Figure 10:
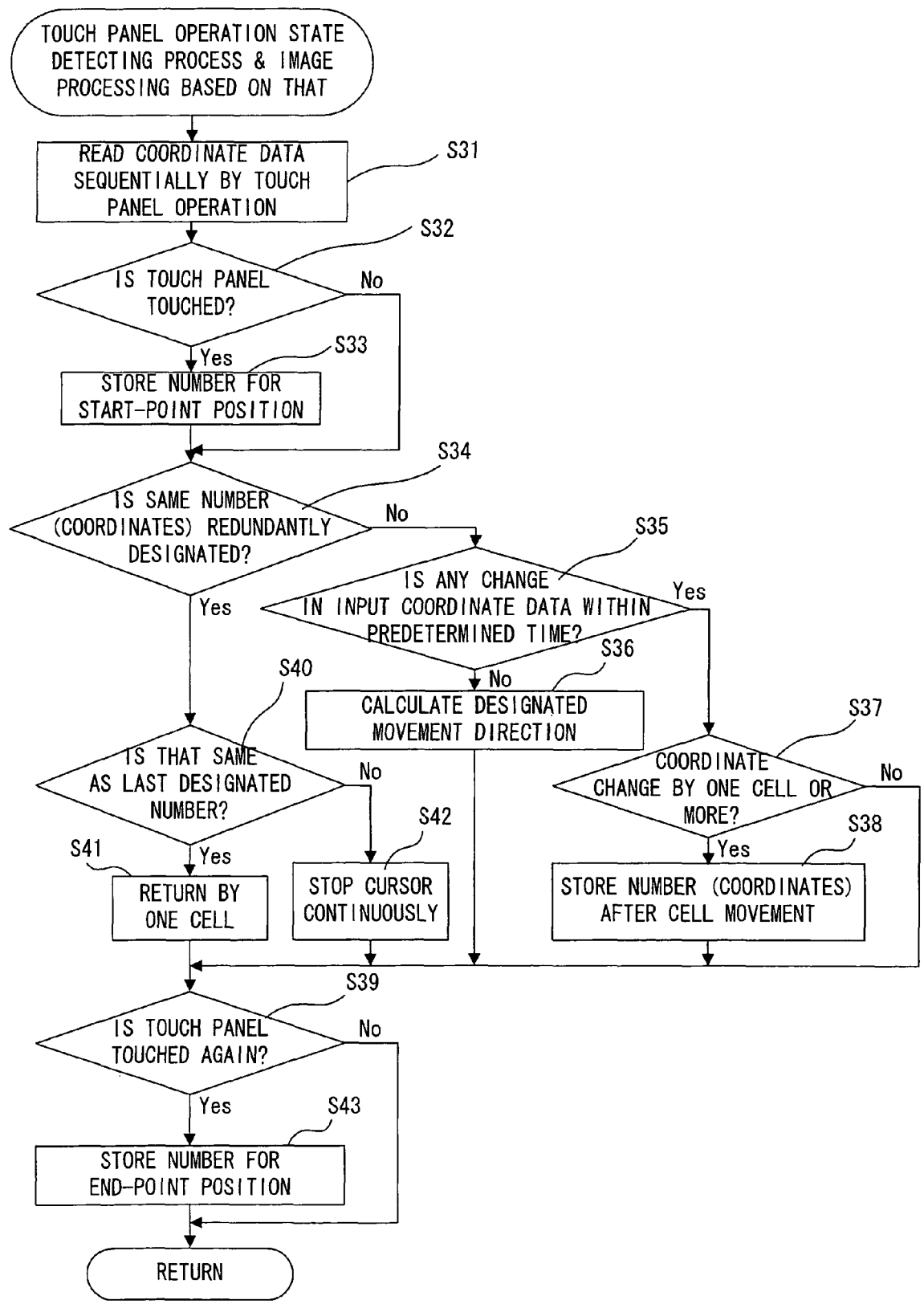
FIG. 10 is a detailed flowchart of a touch panel operation state detecting process and image processing based on the detecting process.
Figure 11:
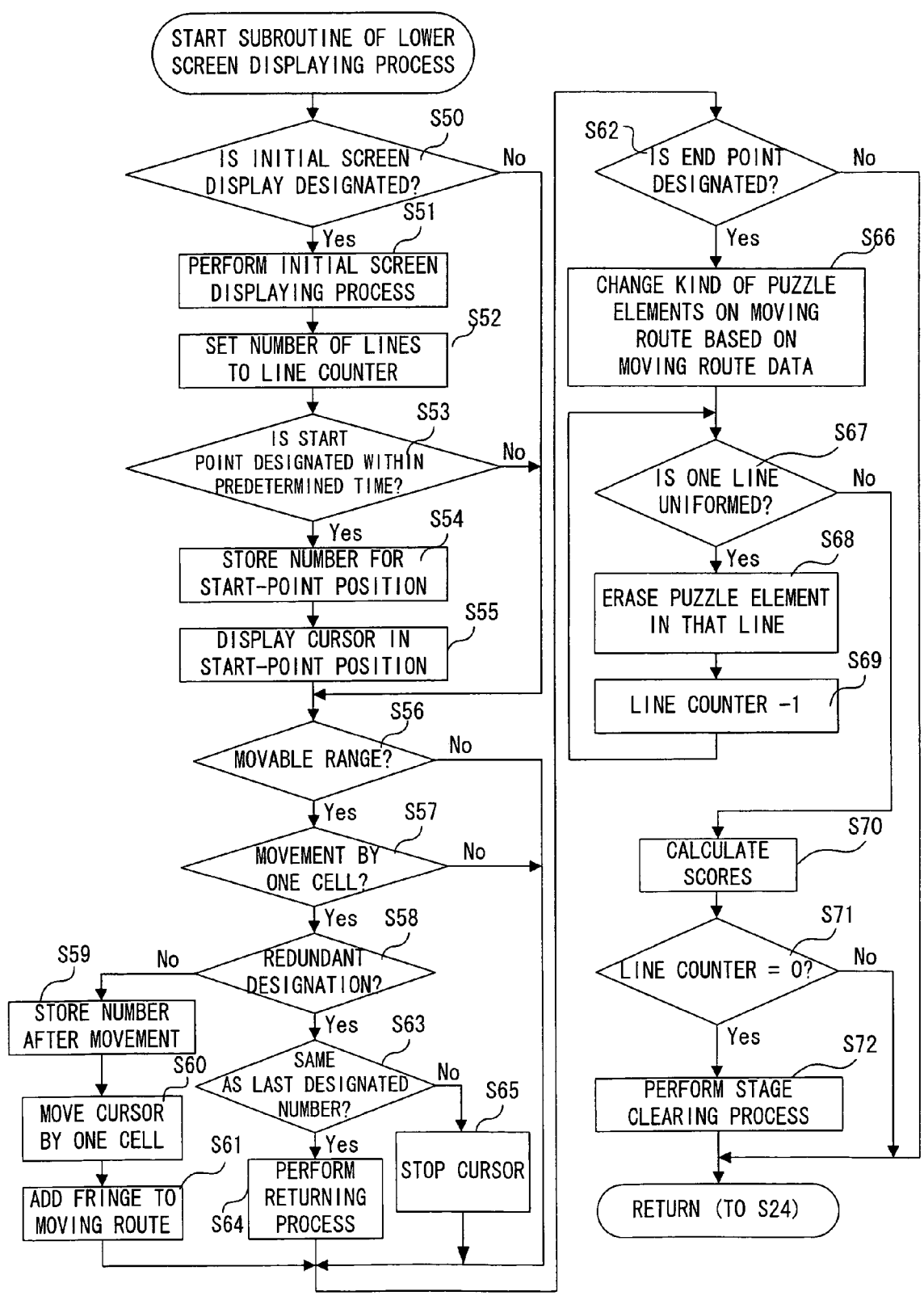
FIG. 11 is a flowchart (a subroutine of lower screen display control in step S23) for describing the detailed operation of the puzzle element display game.

FIG. 8 to FIG. 11 present a flowchart for describing the operation of one example of a puzzle element display game (software game), and more specifically, FIG. 8 and FIG. 9 indicate a main routine, FIG. 10 presents a detailed flowchart of detecting process of touch panel operation state and image processing based on the detecting process, and FIG. 11 is a detailed flowchart of display control in the puzzle element display area (a subroutine of lower screen display control program). Next, referring to FIG. 1 to FIG. 10, a brief description is provided below as to the operation of this embodiment with respect to the puzzle element display game of FIG. 7, according to the flow of FIG. 8 to FIG. 10.

When a power switch (not shown) has been turned on, the CPU core 31 starts the processes described below based on the programs stored in the storage area 215 of the ROM 20. Firstly, in a step (abbreviated as "S" in the attached drawings) 11, an initial process is performed. As the initial process, for example, the W-RAM 3 and the V-RAMs 38 and 39 are cleared, backup data stored in the RAM 25 (if some game has been already played so far, historical data including the number(s) for the stage(s) cleared and the score(s) gained until the last time) is read and written into the backup data storage area 373 in the W-RAM 37. Also, the screen for selecting the stage at the game is to be started is displayed for the player to select whether to start from the first stage with number 1 or from the stage continued from the last time. In a step 12, the selected stage number (the number "1" for the first time) is set in the stage counter (or the stage register; a certain address in the W-RAM 37, although not shown). This completes the preparations for starting the game.

In a succeeding step 13, a screenful of puzzle element type data and character data for displaying the puzzle elements at the stage set in the stage counter are read from the ROM 20 and written into the storage areas 371 and 373. In a step 14, the data on the coordinates of cursor is set at initial value. For example, the coordinates at which the cursor icon in an undesignated state is to be displayed at the lower right part of the display area 121 on the lower screen LCD 12, is written into the cursor register (a certain address in the storage area 373).

In a step 15, it is determined whether or not any input operation has been performed through the direction designating switch 15a. If it is concluded that some input operation has been performed, the process moves to a step 16. If it is concluded that no input operation has been performed, the process moves to a step 21. In the case where any input operation has been performed through the direction designating switch 15a, a detecting process of the operation state of the direction designating switch 15a is performed in the step 16. For example, if any one of "up", "down", "left" and "right" of the direction designating switch 15a has been pressed, the key code corresponding to the pressed "up", "down", "left" or "right" is read and stored temporarily in an internal register (not shown). In a step 17, a changing process of the current coordinate position of the cursor is performed based on the manipulation of the direction designating switch 15a. In a step 18, it is determined whether or not any input operation has been performed through the other operating switches 15b to 15f. If it is concluded that some input operation has been performed through the operating switches 15b to 15f, an inputting process in accordance with these switches is performed. After that, or if it is concluded that no input operation has been performed through the operating switches 15b to 15f, the process proceeds to a step 20. In this manner, the processes according to the input operations through the direction designating switch 15a and the other action switches 15b to 15f are performed.

In a step 20, it is determined whether or not any coordinate input has been performed through manipulation of the touch panel 16. If it is concluded that some coordinate input has been performed, a touch panel operation state detecting process and a subroutine of image processing based on the detecting process (see FIG. 10) are performed. The operations of these processes are described later.

Then, during the period of time when nothing is displayed on the LCD 11 or the LCD 12, the processes of steps 21 to 23 are performed. More specifically, it is determined in the step 21 whether or not now is the non-display time of the LCD 11 and the LCD 12. If it is concluded that now is the non-display time, the CPU core 31 and the GPU 35 perform in cooperation the image processing on the upper screen in a step 22, based on the upper screen image display controlling program. For example, image data for the upper screen (program data and character data for image display) is read from the W-RAM 37 and provided to the GPU 35. The GPU 35 generates a screenful of image data for the upper screen in the bitmap format and overwrites the image data on the V-RAM 38. With this, the screenful of image data for the upper screen (bitmap data) is temporarily stored in the V-RAM 38. In a succeeding step 23, the CPU core 31 and the GPU 35 perform in cooperation the image processing (display control process) for the lower screen. The lower screen display controlling process is described later in detail with reference to the flowchart of a subroutine of FIG. 11.

In a succeeding step 24, it is determined whether a stage-clearing requirement is satisfied or not. If it is concluded that the stage is not cleared, it is determined in a step 25 whether the game is over or not. The detection of the end of the game occurs based on whether or not the number of counts in the stage counter has reached the maximum stage number (N) or based on a game end requirement (for example, the time limit for clearing one stage has been exceeded). Then, if it is detected that the stage is not cleared in the step 24 and detected in the step 25 that the game is not over, the process returns to the above mentioned step 13 to repeat the operations of the steps 13 to 25 and the operations of steps 28 and 29 described later in a predetermined cycle.

On the other hand, if it is concluded in the above mentioned step 21 that now is the non-display time of the LCD 11 and the LCD 12 (that is, now is the display time), the GPU 35 controls the V-RAM 38 with the timing of display on the LCD 11 to read the image data for the upper screen sequentially in synchronization with frame scanning for a time period of one frame and display the image for the upper screen on the LCD 11 in the step 28. In parallel with this, the GPU 36 reads the V-RAM 39 with the timing of display on the LCD 12, the image data for the upper screen is read sequentially for a one-frame period in synchronization with frame scanning, and displays the image for the upper screen on the LCD 12 in the step 29. In this manner, the upper-screen image is displayed on the LCD 11 and the lower-screen image is displayed on the LCD 12.

Next, referring to FIG. 10, the subroutine of the touch panel operation state detecting process and image processing based on the detection are described below. In a step 31, the coordinate data through manipulation of the touch panel is read and written into the register (a certain address in the storage area 373 of the W-RAM 37). It is determined in a step 32 whether the touch panel has been touched or not. If it is concluded that the touch panel has been touched, this is the designation of start-point coordinates and thus the number for the puzzle element at the start-point position is stored in a step 33. In a step 34, it is determined whether or not the same cell (coordinate) position has been redundantly designated. If it is concluded that the same cell (coordinate) position has not been redundantly designated, the process moves to a step S35. In the step 35, it is determined whether or not any change has been made to input coordinate data within a predetermined period of time. If it is concluded that no change has been made to the input coordinate data within the predetermined period of time, the coordinates in the designated movement direction is calculated in a step 36. The process of calculating the movement direction is carried out by determining a tilt (angle) from the respective amounts of change in X-axis element and Y-axis element, for example. On the other hand, if it is concluded that some change has been made to the input data within the predetermined period of time, it is determined in a step 37 whether or not the cursor has been moved by one cell or more. If it is concluded that the cursor has been moved by one cell or more, the data of the numbers (or the coordinates) for the puzzle elements, cells or panels in the passable area 122 after the cursor movement are written to and stored temporarily in the storage area 372 in a step 38. After that or in the above mentioned step 37, if it is concluded that the cursor has not been moved by one cell or more within a predetermined period of time (there is no change in the input coordinates), the process proceeds to a step 39. In the step 39, it is determined whether or not the touch panel has been touched again. If it is concluded that the touch panel has not been touched again, the process returns to the above mentioned step 21.

Besides, if it is concluded in the above mentioned step 34 that the puzzle element (and/or the panel in the passable area) at the position of the same number has been redundantly designated after the touch of the touch panel, it is determined in a step 40 whether or not the number for that puzzle element is the same as the number (coordinate position) for the last designated puzzle element. If the number is the same as that for the last designated puzzle element, this means the designation of canceling the selection and returning to the previous state (or canceling all), and thus a process of returning by one cell is performed. In the returning process, the last designated number is deleted from the moving route data stored in the storage area 372. On the other hand, if it is concluded that the number is not the same as that for the last designated puzzle element, this means that some puzzle element with a previously designated number is designated and that the cursor is operated in such a manner that the moving route forms a loop and intersects with the previously designated puzzle element. Thus, the process moves to a next step 39 while the cursor remains at rest. With this, the registration of the designated puzzle elements (writing of the puzzle element numbers) is prohibited when any operation is performed in such a manner as to infringe the rules for designating puzzle elements with one stroke.

In addition, if the designation of the movement direction of the cursor is to be continued, the steps 13 to 25 and 31 to 39 or the steps 13 to 25, 31 to 34, 40 to 42, and 39 are repeatedly performed. During the processes, the gradually changing number or coordinate data for each of the cells are detected in sequence, and the number or coordinate data for each of the cells in sequence after the movement is written into the storage area 372 in a step 38. This makes it possible to cumulatively store the data on the moving route of the puzzle elements designated through manipulation of the touch panel 16 in the storage area 372.

On the other hand, if it is concluded in the above mentioned step 39 that the touch panel 16 has been touched again, this means the designation of the end-point position. Accordingly, the number (or the coordinate position) for the puzzle element at the end point is written into the storage area 372, and then the process returns to the above mentioned step 21.

Next, referring to a subroutine of lower screen display control shown in FIG. 11, a detailed operation is described below according to the flow of game display as shown in FIG. 7. In a step 50, it is determined whether or not the display of an initial screen has been designated. In a step 51, a process of displaying the initial screen is performed. This process allows the initial screen to be displayed in the above mentioned step 29 (FIG. 7A). In a succeeding step 52, the maximum displayable number of lines in the display area 121 (6 in FIG. 6 and FIG. 7) is set to a line counter (or a line register) at an address of the storage area 373. However, the process of step 52 is intended for the case where game stages are to be cleared, and is not necessary in the case where scores are obtained according to the number of erased lines. In a step 53, it is determined whether the position of the start point has been designated or not. If it is concluded that the start point has been designated, the number for the puzzle element at the start-point position is stored in the storage area 372 in a step 54. In a step 55, the cursor is displayed at the start-point position (FIG. 7B). In a step 56, it is determined whether this is within a movable range or not. If this is within the movable range and a moving operation has been performed by one cell, a movement process is performed in steps 57 to 61 described later. If this is not within the movable range, the process goes to a step 62. In the case where this is within the movable range, it is determined in the step 57 whether or not a moving operation has been performed by one cell. If the moving operation has been performed by one cell, it is determined in the step 58 whether or not the puzzle element in the same position has been redundantly designated. If it is concluded that the same cell position as that of the previously designated puzzle element has not been redundantly designated, the number for the puzzle element after the cursor movement is stored in the storage area 372 in a step 59. Subsequently, in a step 60, a process of moving the cursor by one cell is performed. After that, in a step 61, a process of adding a fringe to the moving route is performed. Then, in a step 62, it is determined whether an end point has been designated or not. If it is concluded that no end point has been designated, the process returns to the above mentioned step 24 (FIG. 9). Then, the main routine is repeated and, each time it reaches the step 23, it is concluded in a step 50 that the display of the initial screen has not been designated. Thus, the process proceeds to a step 56 to perform the processes of step 56 and later. In this manner, each time the cursor is moved by one cell or each time the touch panel 16 is touched and the touch position is moved over the touch panel 16, the processes of steps 50, 56 to 60, and 62 are repeated, and the numbers for the designated puzzle elements and the panels in the passable area 122 in order of designation are temporarily stored as moving route data in the storage area 372.

On the other hand, if it is concluded in the above mentioned step 58 that some puzzle element (or panel in the passable area) with the same number has been redundantly designated after the touch of the touch panel, it is determined in a step 63 whether or not this number is the same as the number (coordinate position) for the last designated puzzle element. If the number is the same as the last designated puzzle element, this means the designation of canceling the selection and returning to the previous state (or canceling all). Thus, a process of returning by one cell is performed. In the returning process, the last designated number is deleted from the moving route data stored in the storage area 372. On the other hand, if it is concluded that the number is not the same as that for the last designated puzzle element, this means that some puzzle element with a previously designated number is designated and that the cursor is operated in such a manner that the moving route forms a loop and intersects with the previously designated puzzle element. Thus, the process moves to a next step 62 while the cursor remains at rest in a step 65. As a consequence, the registration of designated puzzle elements (writing of the puzzle element numbers) is prohibited when some operation is performed in such a manner as to infringe the rules for designating puzzle elements with one stroke.

Besides, if it is concluded in the above mentioned step 62 that the end point has been designated, a process of changing the kind of the puzzle elements on the moving route is performed in a step 66 based on the moving route data from the start point to the end point stored in the storage area 372. By this process, the kind of the puzzle elements on the moving route is changed (inverted) in the step 29 in a cycle of next main routine (FIG. 7E). Subsequently, in a step 67, it is determined whether or not the puzzle elements in a line (or a column) have been uniformed in kind. If it is concluded that the puzzle element in the line (or the column) has been uniformed in kind, a process of erasing the line of puzzle elements uniformed in kind is performed in a step 68. The line counter is decremented by 1 in a step 69, and the process returns to the step 67. Besides, the process of decrementing the counter is required in the stage-clearing mode, as in the case with the process of step 52. In the endless mode in which, each time puzzle elements in a line is erased, puzzle elements in a new line comes down, the number of erased lines is cumulatively counted (that is, the sum of erased lines is added up) and used for score calculation. After that, the process returns to the step 67. If it is concluded that there is no puzzle elements uniformed in kind in a line, the process proceeds to a step 70. In the step 70, the scores are calculated as required (or only if a score-giving requirement is satisfied). In the score calculating process, a predetermined number of scores are given or scoring is omitted (competition occurs in the number of cleared stages instead of the number of scores) in the stage-cleared mode, or the total number of erased lines is calculated in the endless mode. In a succeeding step 71, it is determined whether the counted value in the line counter is 0 or not. If it is concluded that the value is not 0, the process returns directly to the step 24. If it is concluded that the counted value in the line counter is 0, a stage clearing process (erasing of all the puzzle elements, for example) is performed in a step 72, and then the process returns to the step 24. The steps 71 and 72 are omitted in the endless mode. If the stage is cleared, the stage counter is incremented by 1 in the above mentioned step 26 and then the process proceeds to the step 25 to display an initial stage at a next stage. This completes the process of game display at one stage.

Besides, if it is concluded in the step 67 that there is no puzzle element uniformed in kind in a line, the steps 70 and 71 are performed, and then the process returns to the step 24 to repeat the above mentioned operation. In this manner, it is repeatedly determined whether or not puzzle elements in a line has been uniformed in kind each time the start point and the end point are designated.

Then, if it is concluded in the above mentioned step 25 that the game end requirement has been reached, the process proceeds to the step 28 to perform a game end process. In the game end process, for example, the CPU core 31 reads game historical data (the numbers for played stages and various kinds of backup data such as gained scores) stored in the W-RAM 37 and writes it into the RAM 25 of the memory card 20. This completes a series of game processes.

As stated above, according to the puzzle element display game apparatus or program of this embodiment, it is possible to provide many display patterns for puzzle elements according to the number of lengthwise and breadthwise cells in the display area and may routes capable of being designated with one stroke. This implements a puzzle game requiring the player of a high-level thinking faculty. Moreover, it is possible to change the kind of puzzle elements and erase the puzzle elements at a time depending on the selection of a route, which allows the player to feel great gratification and satisfaction.

In addition, puzzle elements can be displayed in various display patterns, not limited to the ones in relation to the above described embodiment of FIG. 7. The embodiment of FIG. 7 shows the state in which all the puzzle elements in the display area 121 are uniformed in color. In some cases, puzzle elements of kinds different from line to line may be erased at a time.

Figure 12:
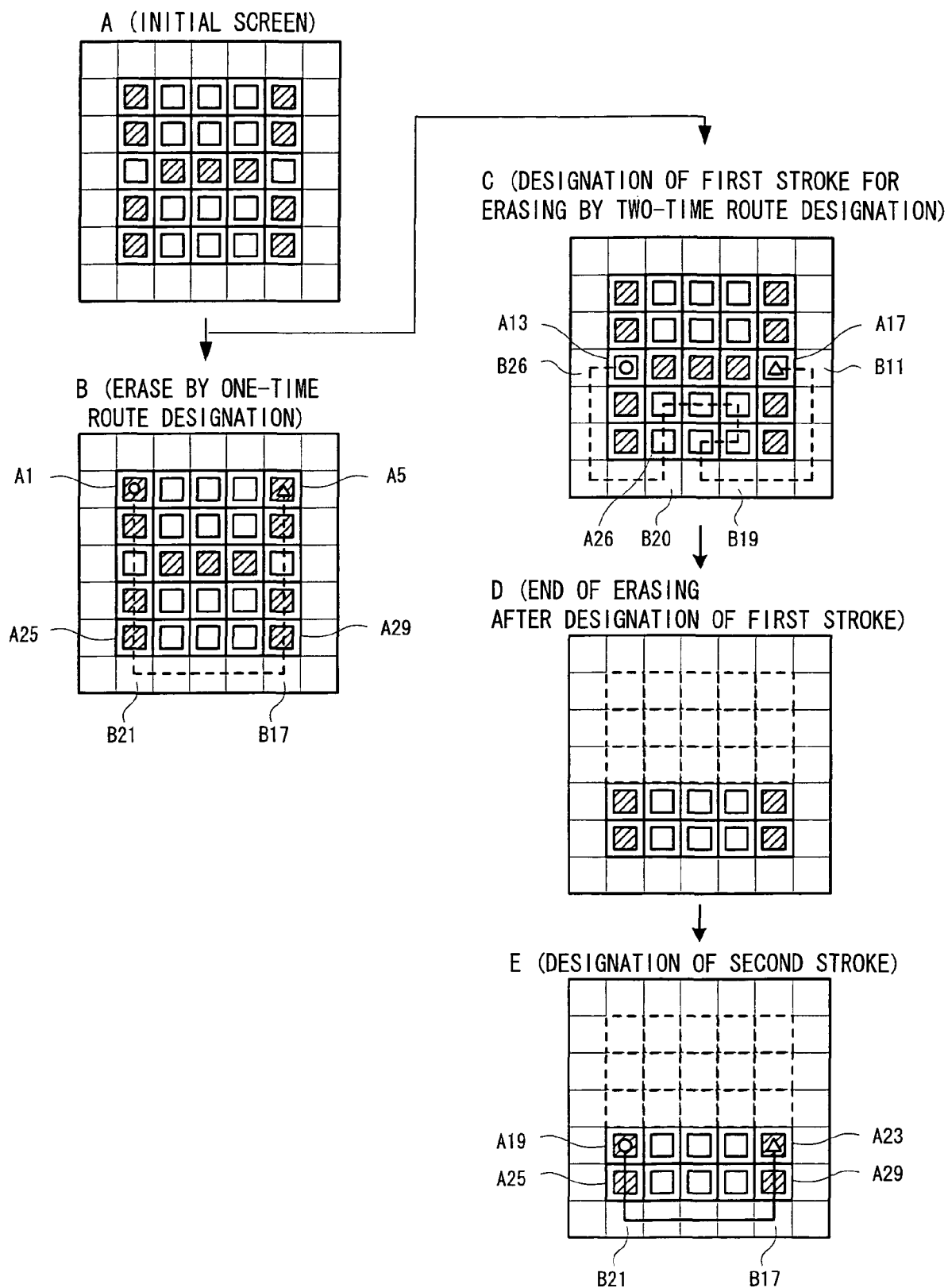
FIG. 12 is a diagram for describing the flow of another example of display state transition in the puzzle element display game.

FIG. 12 presents another example of puzzle elements in a 5 lengthwise×5 breadthwise display pattern. Referring to the display pattern example of FIG. 12, descriptions are given below as to the case in which all the puzzle elements can be erased with one stroke (at a time) and the case in which all the puzzle elements can be erased with two (or more) strokes depending on how they are designated. In the example of FIG. 12, it is possible to explain the relationships between the puzzle element display positions and the cells in the display area 121 of FIG. 6 in correspondence with the cell numbers A1 to A29 of FIG. 6, excluding A31 to A36 in lower first line (sixth line from the top) and A6, A12, A18, A24, A30 and A36 in right first column. In this case, the passable area 122 is described without consideration given to B23 and B14 associated with the lower first line and B7 and B16 associated with the right first column.

Description is given below as to the case where puzzle elements are erased with one stroke in the display pattern of initial screen as shown in FIG. 12A. Referring to FIG. 12B, the player designates the puzzle element A1 (in the first line and first column) as a start point, moves the cursor downward directly from the start point and designates the puzzle elements A7, A13, A19 and A25 in sequence, passes through the puzzle element B21 in the passable area 121 and proceeds rightward to B20, B19, B18 and B17, designates the puzzle elements A23, A17, A11 and A5 in this order upward from the position of the puzzle element A29 immediately above B17, and then designates A5 as an end point. Accordingly, the puzzle elements A1, A7, A19, A5, A11, A23 and A29 are inverted to white, and the puzzle elements A13 and A18 are inverted to black. As a result, the four lines (first, second, fourth and fifth lines) are turned into white and the one line (third line) is turned into black, which allows all the puzzle elements to be erased at a time.

Additionally, in the display pattern of FIG. 12A, the puzzle elements may be erased with two strokes (or by designating twice the route from the start point to the end point). In this case, as shown in FIG. 12C, the player designates the puzzle element A13 as a start point, passes through the panels B26, B25, B24, B22, B21 and B20 in the passable area 122 and designates the puzzle elements A26, A20, A21, A22, A28 and A27 above B20 in sequence, passes through the panels B19 to B17, B15 and B13 to B11 in the passable area 121 below A27 and designates the puzzle element A17 as an end point, thereby turning the puzzle elements in the lower three lines into white and erasing them. In response to that, the puzzle elements in the upper two lines are dropped and displayed in the position of the lower second line in the initial screen (see FIG. 12D). In this state, the player further designates the puzzle elements A19 as a start point and A25 in sequence, passes through the panels B21 to B17 in the passable area 122 and designates the puzzle element A29 above B17, and designates the puzzle element A23 as an end point. This allows all the puzzle elements in the lower two lines to be uniformed in color of white and erased.

In addition, the route of designation/movement between the start point and the end point may be asymmetrical (the start point is A17, the end point is A13, and the passable route is reversed).

Besides, the above description of the embodiment is intended for the case in which the puzzle display game of the present invention applies to a hand-held game machine with a touch panel. The technical philosophy of the present invention is not limited to this embodiment and is applicable to home video game machines, arcade game machines, and software games for personal computers and mobile phones. In addition, the present invention may be used as not only a one-person software game but also a software game in which multiple persons play a match.

Second Embodiment

In the game apparatus 10 of the second embodiment, an initial screen is displayed using puzzle elements of kinds different from those of the puzzle elements shown in relation to the first embodiment (special puzzle elements). The second embodiment is identical to the first embodiment except that puzzle elements are erased according to the special puzzle elements. Thus, the second embodiment is described below in terms of difference from the first embodiment, and the identical description is omitted.

For example, displayed in the initial screen as shown in FIG. 13 (A) are puzzle elements 124b and 124w with front and back sides of two colors (white and black), which are mentioned in relation to the first embodiment. For convenience of description, these puzzle elements 124b and 124w are hereinafter referred to as normal puzzle elements 124b and 124w in the second embodiment. Besides, other puzzle elements different from the normal puzzle elements 124b and 124w are also displayed. More specifically, a puzzle element with one main side of two colors (white and black) (hereinafter referred to as "multi-puzzle element") 124m is displayed, and a puzzle element with front and back sides of two colors (white and black) that is not changed in display position except when it is erased (hereinafter referred to as "fixed puzzle element") 124f is displayed.

Besides, in the initial screen shown in FIG. 13 (A), both the multi-puzzle element 124m and the fixed puzzle element 124f are displayed in addition to the normal puzzle elements 124b and 124w. Alternatively, only either the multi-puzzle element 124m or the fixed puzzle element 124f may be displayed.

Also, for the sake of easiness of understanding, in FIG. 13 (A) and the other drawings, the black of the multi-puzzle element 124m is expressed by filling it instead of shading it.

Moreover, as shown in FIG. 13 (A), the puzzle elements (124b, 124w, 124m and 124f) are not necessarily displayed in all the cells (the panels A1 to A18 shown in FIG. 13 (B)) and may be displayed in some of them.

Here, the multi-puzzle element 124m has the attributes of both the normal puzzle element 124b and the normal puzzle element 124w (colors in this case). If the puzzle elements other than the multi-puzzle element 124m in the same line are of the same kind (the same attribute), the multi-puzzle element 124m is turned into a puzzle element of the same attribute as that of the other puzzle elements and then the line is erased. Alternatively, the line may be erased without having to change the attribute of the multi-puzzle element 124m. When a predetermined requirement is required that all the other puzzle elements in one line are of the same color, the multi-puzzle element 124m in the line is not inverted and its color is changed to that color regardless of the presence or absence of designation by the player. More specifically, when such a requirement is satisfied, the multi-puzzle element 124m turns into the normal puzzle element 124b or 124w.

Additionally, the fixed puzzle element 124f has an attribute with which it stays in the original panel (position) even when there is no puzzle element in the panel below it. Thus, the other puzzle elements (124b, 124w and 124m) displayed above the fixed puzzle elements 124f are supported by the fixed puzzle element 124f. When the fixed puzzle element 124f is erased, the other puzzle elements fall by gravitation. The falling puzzle element moves to the lowest level in the panel display area 121. However, if another puzzle element exists on the falling course, the falling puzzle element moves down to above the other puzzle element so as to be stopped by the other puzzle element.

Besides, in this embodiment, the fixed puzzle element 124f is expressed by displaying fixedly the normal puzzle element 124b or 124w. The fixed puzzle element 124f, as in the case with the normal puzzle elements 124b and 124w, is turned inside out and inverted in color between white and black, depending on the player's selection. Then, when one or more fixed puzzle elements 124f and other puzzle elements (124b and 124w) in one line have the same attribute (color, for example), the line is erased.

Also, as shown in FIG. 13 (B), the panel display area 121 is provided with panels A1 to A18, and the passable area 122 around there is provided with panels B1 to B22. However, the numbers for the panels here are given only for the convenience of description, and have no relation with the panel numbers in the first embodiment. In addition, although not shown, each of the panels may be designated by coordinates (coordinate data) as described in relation to the first embodiment.

As understood by reference to FIG. 13 (A) and FIG. 13 (B), the normal puzzle elements 124b are displayed in the panels A1, A4, A7, A15 and A18, and the normal puzzle element 124w is displayed in the panel A8. Also, the multi-puzzle elements 124m are displayed in the panels A2, A5 and A9. In addition, the fixed puzzle elements 124f are displayed in the panels A10, A11 and A12.

With the use of the drawings, a description is given below as to the manner by which the player clears a stage by designating desired panels in the manner of one-stroke drawing to change the display state of the panels. As for the second embodiment, the description is intended for the case in which the player designates the panels by operating the direction designating switch 15a. However, the panels can be designated by touching the touch panel, as described in relation to the first embodiment.

As shown in FIG. 13 (A), the initial screen is displayed in the state where no start point is yet decided. In FIG. 13 (A), the mark of the cursor (●) showing an unselected state is displayed in the panel B1. When the player operates the direction designating switch 15a, the mark moves in accordance with the panels (the cells). For example, by operating the direction designating switch 15a, the player moves the cursor to right by two cells and further moves it downward by two cells. FIG. 13 (C) shows the state where the start-point position is decided in this manner. However, in FIG. 13 (C), the mark (○) of the cursor showing a selected state in relation to the decision of the start-point position is displayed in the panel A8. In order to bring the cursor into the selected state, that is, in order to decide the start-point position, the action switch 15d is operated (turned on), for example. At that time, the number for the panel in the start-point position is stored as moving route data in the storage area 372. The same applies to the following cases of deciding the cell. Additionally, in order to turn the cursor from the selected state into the unselected state, that is, in order to cancel the decision of the start-point position, the cursor is pointed at the panel in the start-point position and then the action switch 15d is operated. Although not illustrated, when the start-point position is canceled, the mark of the cursor in the unselected state is displayed and the number for the panel in the start-point position stored in the storage area 372 is deleted. Alternatively, the decision of the start-point position may be canceled just by operating the action switch 15e. The same applies to the case of canceling any cell other than the cell in the start-point position.

Figure 14:
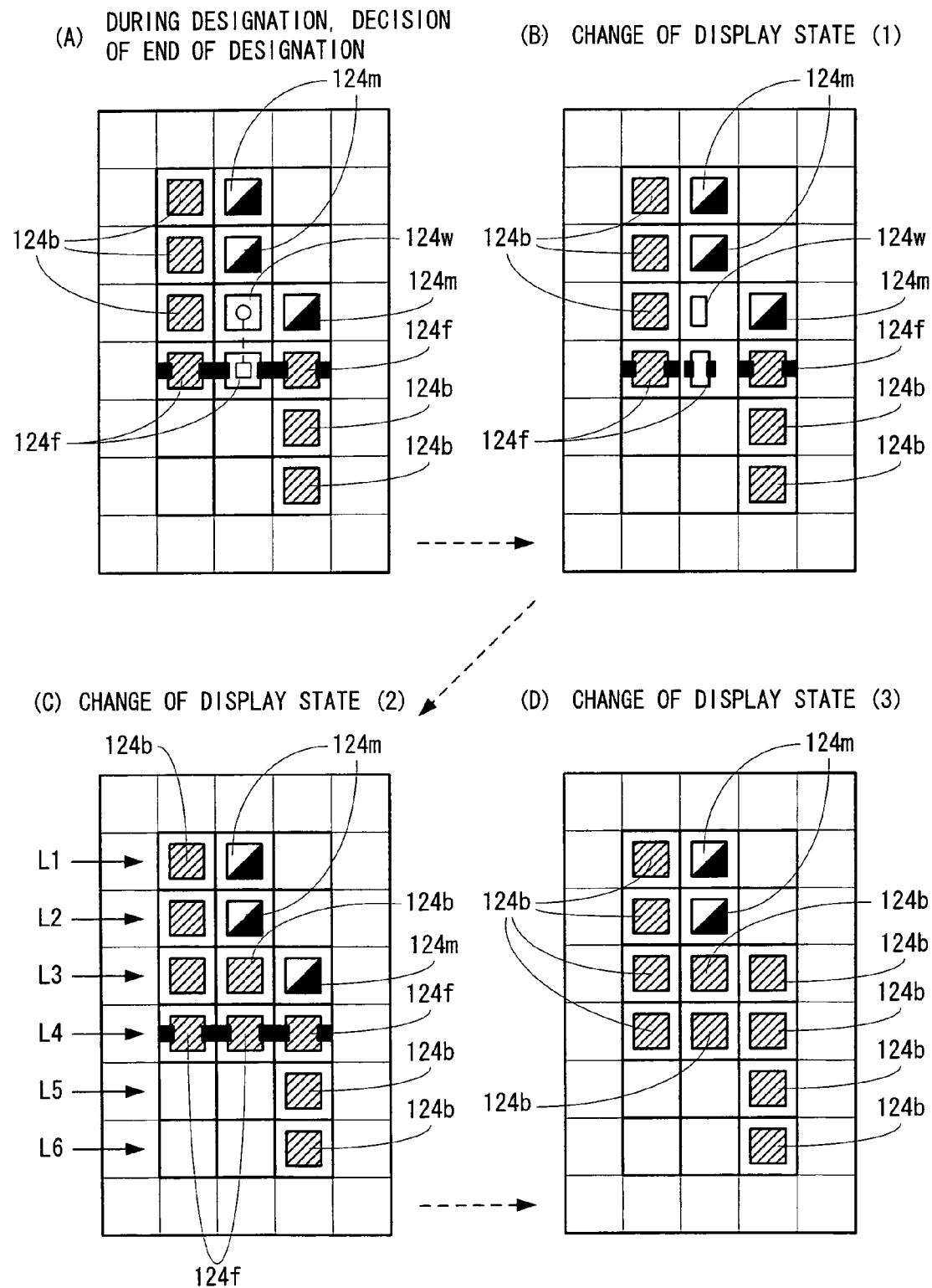
FIG. 14 is an illustrative view showing one example of designation of puzzle elements and display state transition in the puzzle element display game of the second embodiment.

FIG. 14 (A) shows a state in which, under such a condition as shown in FIG. 13 (C) (the start-point position is decided), the cursor is moved downward by one cell through operation of the direction designating switch 15*a* and the end-point position is decided through operation of the action switch 15*d*. In FIG. 14 (A), the mark (☐) of the cursor in the selected state in relation to the selection of the end-point position is displayed in the panel A11. That is, the player here designates the two cells in the panels A8 and A11 in the manner of one-stroke drawing.

When the selection of the end-point position is completed, that is, when the completion of designation is determined, the display states of the designated panels (A8 and A11 here) are changed (1) as shown in FIG. 14 (B). More specifically, the panels A8 and A11 start to be turned over, and the state of the turnover in progress is shown in FIG. 14 (B). Then, as shown in FIG. 14 (C), the panels A8 and A11 are turned inside out and their display states are changed (2). That is, the attributes of the panels A8 and A11 are changed. To be more specific, the normal panel 124*w* displayed in the panel A8 is turned into the normal panel 124*b* with color change from white to black, and the fixed puzzle element 124*f* in the panel A11 is changed in color from white to black.

When the display states of the panels designated by the player have been changed, it is determined whether or not to erase the puzzle elements. However, in the second embodiment, the erase determination is carried out on the puzzle elements in all the lines, and the lines to be erased are erased at a time. In addition, it is determined whether or not to erase the line in which the multi-puzzle element 124*m* exists, depending on whether or not the puzzle elements other than the multi-puzzle element 124*m* have the same attribute (color). Moreover, when the line with the fixed puzzle element 124*f* has been erased, the puzzle element displayed above the fixed puzzle element 124*f* falls (falling process). Then, it is determined whether or not to erase the puzzle elements in each of the lines, based on the display state after the falling (erase determining process). After that, the lines to be erased are erased at a time (erasing process). Besides, if the fixed puzzle element 124*f* exists in any of the erased lines, the falling process, the erase determining process and the erasing process are carried out on the line. These processes are repeated as long as the fixed puzzle element 124*f* exists in the line to be erased.

Returning to FIG. 14 (C), the panels with no puzzle element (A3, A6, A13, A14, S16 and A17) exist in the first line (L1), the second line (L2), the fifth line (L5) and the sixth line (L6), and thus these lines are not to be erased. Also, all the puzzle elements arranged in the third line (L3) are the normal puzzle elements 124*b* of the same color except for the multi-puzzle element 124*m*, and thus this line is to be erased. Moreover, all the fixed puzzle elements 124*f* are of the same color in the fourth line (L4), and thus this line is to be erased. In this manner, the erase determining process is carried out on each of the lines.

Upon completion of the erase determining process, the erasing process is carried out as mentioned above. In the second embodiment, however, the multi-puzzle elements 124*m* and the fixed puzzle elements 124*f* exist and thus, in the case of erasing a line containing the multi-puzzle element 124*m* or the fixed puzzle elements 124*f* or the both, the line is erased after the display state of these puzzle elements is changed, for example, after the display state shown in FIG. 14 (C) is changed into the display state shown in FIG. 14 (D) (3). More specifically, since the third line (L3) to be erased contains the multi-puzzle element 124*m* as shown in FIG. 14 (C), the multi-puzzle element 124*m* is turned into the normal puzzle element 124*b* as shown in FIG. 14 (D). Also, since the fourth line (L4) to be erased contains only the fixed puzzle elements 124*f* as shown in FIG. 14 (C), the fixed puzzle elements 124*f* are released from the fixed state and turned into the normal puzzle elements 124*b* as shown in FIG. 14 (D). After that, the puzzle elements in the third line and the fourth line are erased and the display state is changed as shown in FIG. 15 (A) (4).

As a result, the puzzle elements supported by the fixed puzzle elements 124*f*, etc., that is, the normal puzzle element 124*b* and the multi-puzzle element 124*m* in the first line, and the normal puzzle element 124*b* and the multi-puzzle elements 124*m* in the second line fall to the lower part of the drawing, and the above mentioned puzzle elements are moved down to the fifth line and the sixth line, and the display state is changed as shown in FIG. 15 (B) (5). More specifically, the type data of the panel A1 is stored in association with the panel A13, the type data of the panel A2 is stored in association with the panel A14, the type data of the panel A4 is stored in association with the panel A16, and the type data of the panel A5 is stored in association with the panel A17. Besides, the type data of the panel A1 is changed in correspondence with the order of the panels A4, A7, A10 and A13 so as to show the manner in which the puzzle elements are falling. The same applies to the type data stored in association with other panels. Herewith, the screen is displayed based on the changed type data to indicate the manner in which the puzzle elements are falling.

When the puzzle elements have been moved, the erase determining process is carried out as stated above. The first line to fourth line are not to be erased because no puzzle element is displayed in these lines as shown in FIG. 15 (B). The fifth line and the sixth line are to be erased because the puzzle elements displayed in the two lines are the normal puzzle elements 124*b* except for the multi-puzzle element 124*m*.

Here, as stated above, in the display area 121 shown in FIG. 15 (B), the display states of the fifth line and sixth line are changed before the execution of the erasing process as shown in FIG. 15 (C) because the multi-puzzle elements 124*m* are displayed in these lines (6). That is, the multi-puzzle elements 124*m* are turned into the normal puzzle elements 124*b*. Also, the fifth line and the sixth line are erased, and their display states are changed as shown in FIG. 15 (D) (7). As above, when all the puzzle elements in the display area 121 have been erased, the game (stage) is cleared.

More specifically, the main routine (FIG. 8 and FIG. 9) described in relation to the first embodiment is also carried out in the second embodiment. However, in the second embodiment, the game is to be played by using the key switches (the operating key 15) such as the direction designating switch 15*a*, and thus the key switch operation state detecting process and the image processing based thereon are carried out in a step 30 of the main routine. Moreover, the multi-puzzle element 124*m* or the fixed puzzle element 124*f* may be displayed in the second embodiment. The second embodiment is partly different in the lower screen display process shown in FIG. 11 from the first embodiment because there is a difference between the embodiments in the method of erasing puzzle elements.

Figure 16:
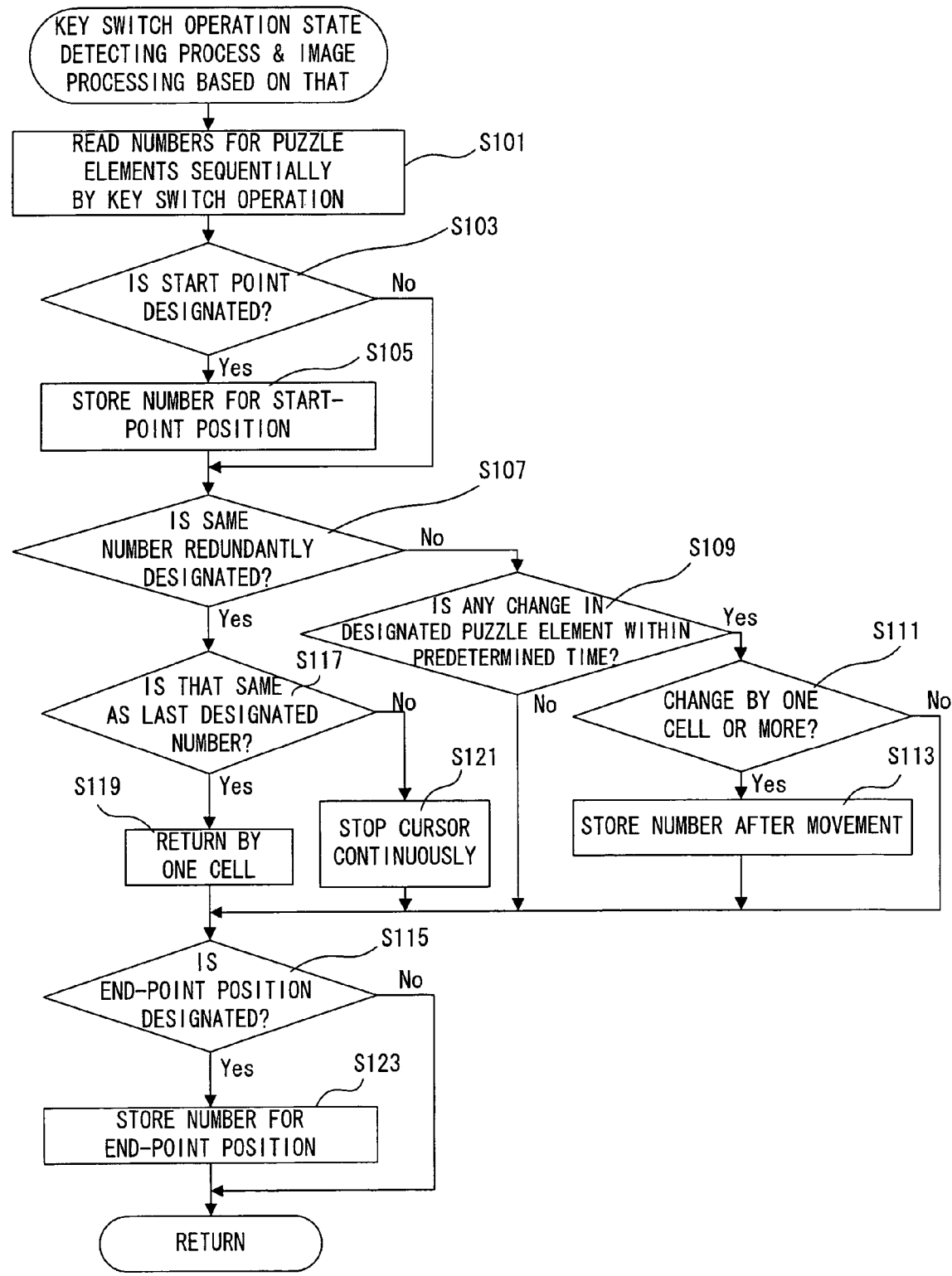
FIG. 16 is a flowchart of key switch operation state detecting process and image processing based on the detecting process in the second embodiment.
Figure 17:
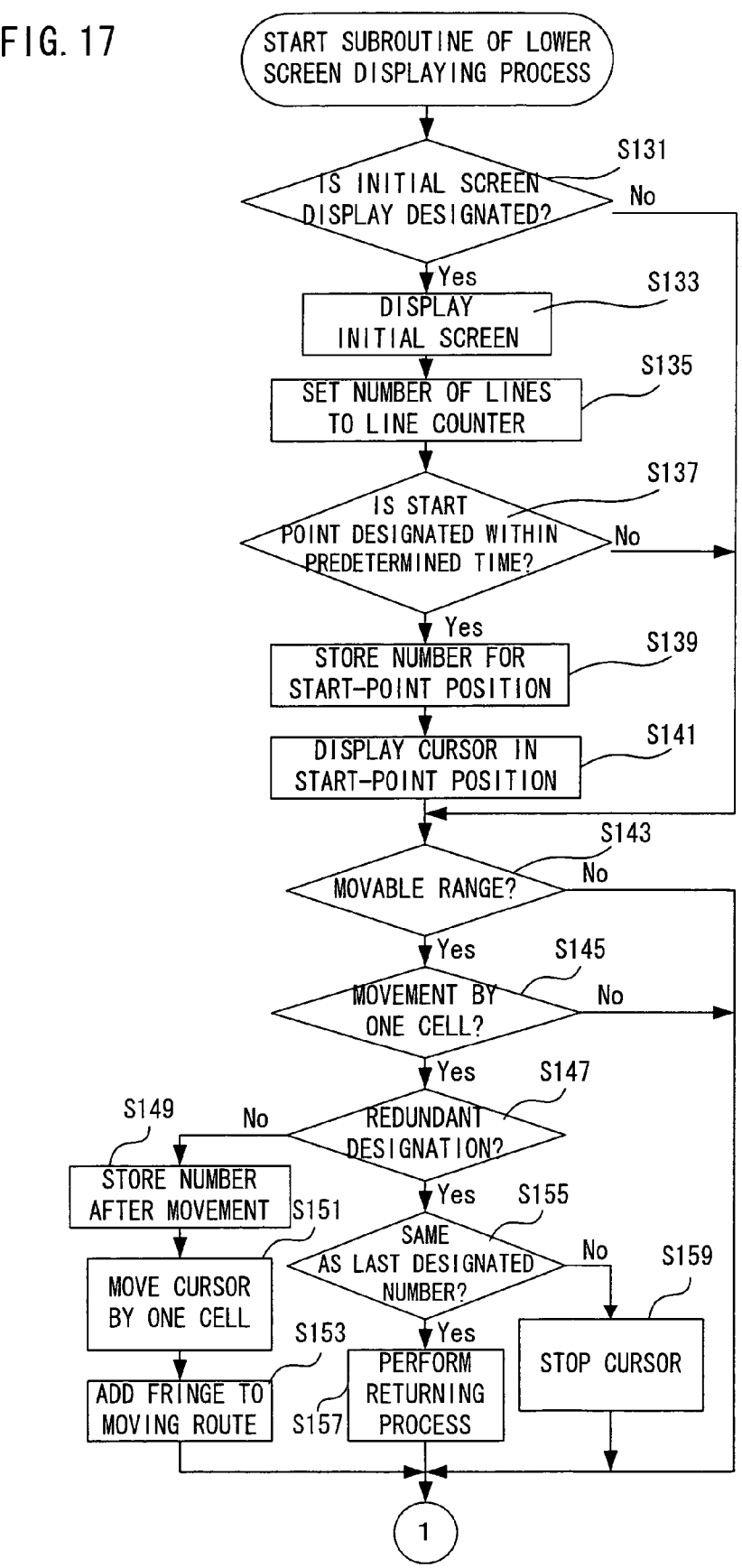
FIG. 17 is a flowchart showing a part of a lower screen displaying process in the second embodiment.
Figure 18:
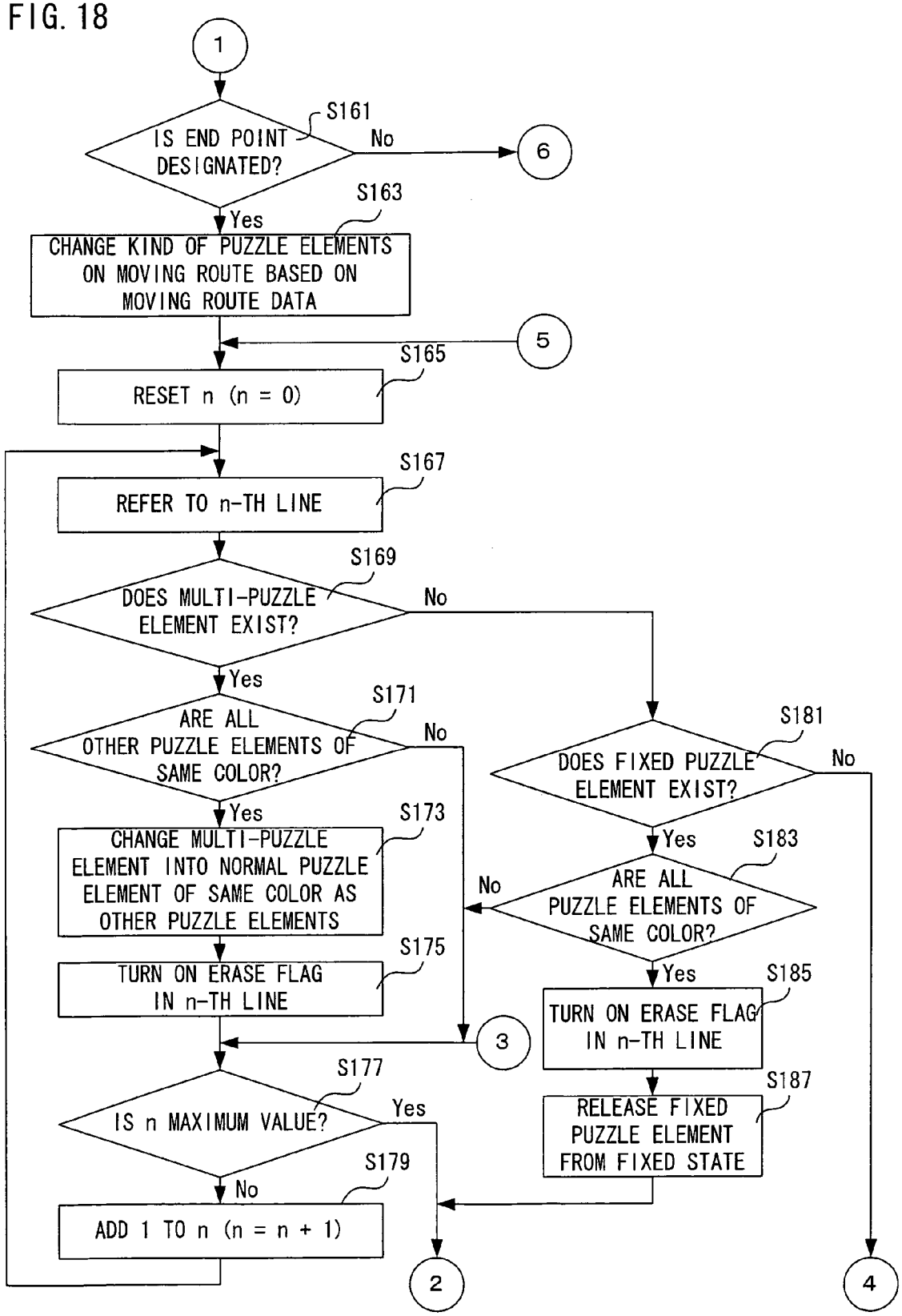
FIG. 18 is a flowchart showing another part of the lower screen displaying process in the second embodiment.
Figure 19:
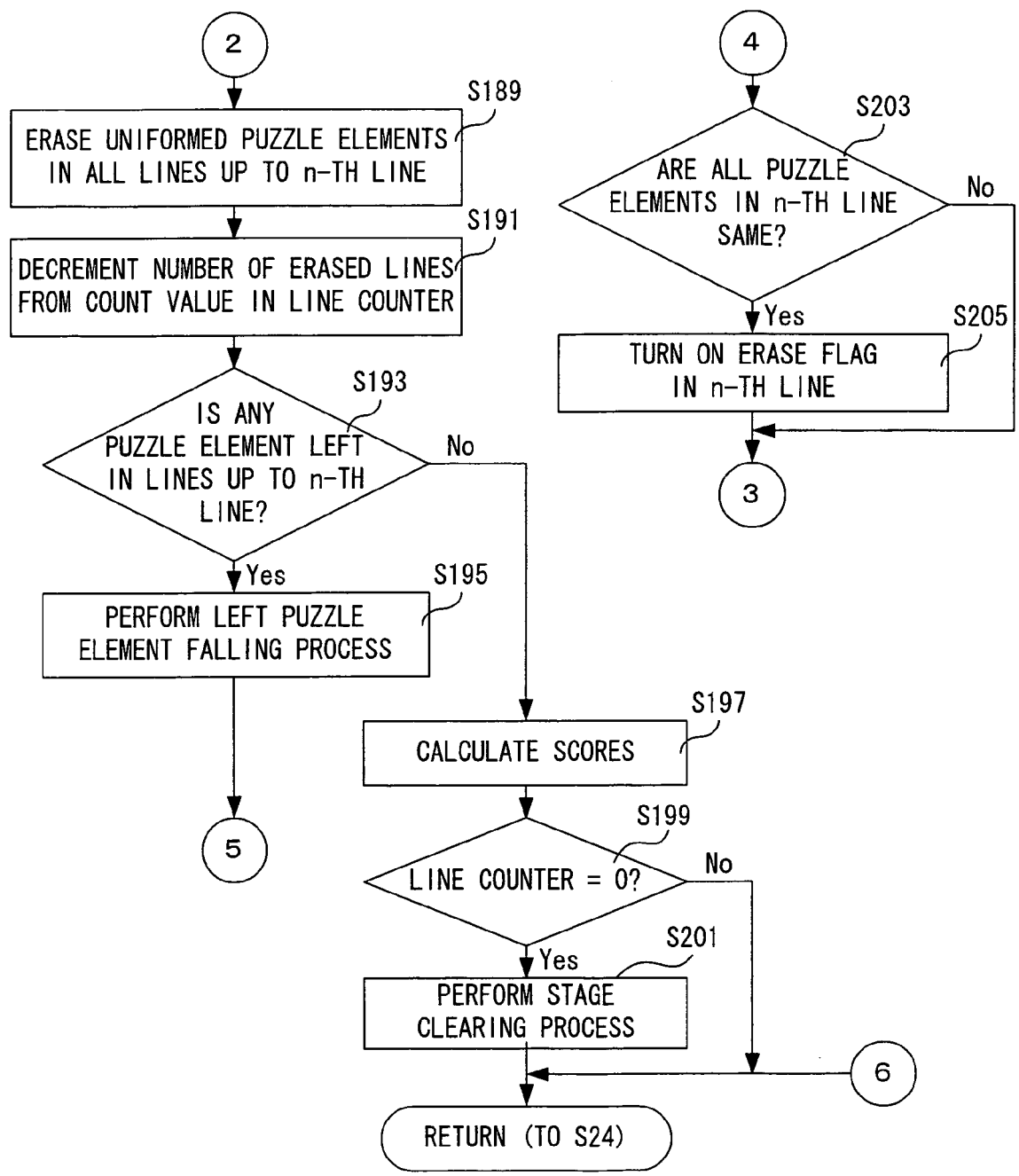
FIG. 19 is a flowchart showing still another part of the lower screen displaying process in the second embodiment.

Therefore, a description is given here as to the key switch operation state detecting process and the image processing and lower screen display process based thereon, and a description of the main routine is omitted. Besides, the flowchart of the key switch operation state detecting process and the image processing based thereon is shown in FIG. 16, and the flowchart of the lower screen display process is shown in FIG. 17 to FIG. 19. In addition, the same processes as those explained above in relation to the first embodiment are described below in brief.

Referring to FIG. 16, when it has started the key switch operation state detecting process and the image processing based thereon, the CPU core 31 reads coordinate data through the operation of the key switch, and writes it into the register (an address of the storage area 373 in the W-RAM 37) in a step 101. In a step 103, it is determined whether the start point is designated or not. That is, it is determined whether or not the cursor has been moved by the direction designating switch 15a and the action switch 15d has been operated. If the cursor is not moved, the action switch 15d alone is operated. If it is concluded that the start point is designated, the number for the puzzle element at the start-point position is stored in a step 105. In a step 107, it is determined whether the same cell has been redundantly designated or not. If it is concluded that the same cell has not been redundantly designated, the process moves to a step 109. In the step 109, it is determined or not any change has been made to the puzzle elements (or the panels) within a predetermined period of time. If it is concluded that no change has been made to the puzzle elements (or the panels) within a predetermined period of time, the process goes directly to a step 115. However, if it is concluded that some change has been made to the puzzle elements (or the panels) within a predetermined period of time, it is determined in a step 111 whether or not the cursor is moved by one cell or more. If it is concluded that the cursor is moved by one cell or more, the data of the numbers for the puzzle elements, cells or panels in the passable area 122 after the cursor movement is written to and stored temporarily in the storage area 372 in a step 113. After that or in the above mentioned step 111, it is concluded that the cursor is not moved by one cell or more within the predetermined period of time, and then the process proceeds to a step 115. In the step 115, it is determined whether the end point is designated or not. That is, it is determined whether the action switch 15d has been operated or not. If it is concluded that the end-point position is not designated, the process returns to the above mentioned step 21.

Besides, if it is concluded in the previous step 107 that the puzzle element (and/or the panel in the passable area) in the position of the same number has been redundantly designated after the designation of the start-point position, it is determined in a step 117 whether or not the number is the same as that for the last designated puzzle element. If the number is the same as that for the last designated puzzle element, it is concluded that the player intends to cancel the selection and designate a return (or cancellation), and thus a process of returning by one cell is performed in a step 119. The returning process is identical to that in the first embodiment. On the other hand, if it is concluded that the number is not the same as that for the last designated puzzle element, this means that some puzzle element with a previously designated number is designated in such a manner that the moving route forms a loop and intersects with the previously designated puzzle element. Thus, the process moves to a next step 115 while the cursor remains at rest in a step 121.

In addition, if the designation of movement direction of the cursor is to be continued, the steps 13 to 25 and 101 to 115 or the steps 13 to 25, 101 to 107, 117 to 121, and 115 are repeatedly performed. During the processes, the changing number or coordinate data for each of the cells in sequence are detected, and the number or coordinate data for each of the cells after the movement in sequence is written into the storage area 372 in a step 38. This makes it possible to cumulatively store the data on the moving route of the puzzle elements designated through manipulation of the touch panel 16 in the storage area 372.

On the other hand, if it is concluded in the above mentioned step 115 that the end-point position was designated, the number (or the coordinate position) for the puzzle element in the end-point position is written into the storage area 372, and then the process returns to the above mentioned step 21.

When the lower screen display process has been started by the CPU core 31, it is determined in a step 131 whether or not the display of an initial screen is designated as shown in FIG. 17. In a step 133, a process of displaying the initial screen is performed. In a succeeding step 135, the maximum displayable number of lines in the display area 121 (6 in FIG. 13 to FIG. 15) is set to a line counter (or a line register) at a certain address of the storage area 373. However, the process of step 135 is required for the case in which game stages are cleared, as with the process of step 52 of the first embodiment, and is not required for the case in which scores are obtained according to the number of erased lines.

Subsequently, it is determined in a step 137 whether or not the position of the start point has been designated within a predetermined period of time. If it is concluded that the start point is designated, the number for the puzzle element at the start-point position is stored in the storage area 372 in a step 139. In a step 141, the cursor is displayed at the start-point position. In the step 143, it is determined whether this is within a movable range or not. If this is within the movable range and a moving operation has been performed by one cell, a movement process is performed in steps 145, 147, 149, 151 and 153 described later. If this is not within the movable range, the process goes to a step 161 shown in FIG. 18.

In the case in which this is within the movable range, it is determined in the step 145 whether or not a moving operation has been performed by one cell. If the moving operation has been performed by one cell, it is determined in the step 147 whether the puzzle element in the same position has been redundantly designated or not. If it is concluded that the same cell position as that of some previously designated puzzle element has not been redundantly designated, the number for the puzzle element after the movement is stored in the storage area 372 in the step 149. Subsequently, in the step 151, a process of moving the cursor by one cell is performed. After that, in the step 153, a process of adding a fringe to the moving route is performed. Then, in a step 161, it is determined whether the end-point position has been designated or not. If it is concluded that the end-point position has not been designated, the process returns to the above mentioned step 24 (FIG. 9) as shown in FIG. 19. Then, the main routine is repeatedly performed and, each time it reaches the step 23, it is concluded in the step 131 that the display of the initial screen has not been designated, and the process proceeds to the step 143 to perform the processes of step 143 and later. In this manner, each time the cursor is moved by one cell (or each time the touch panel 16 is touched and the touch position is moved over the touch panel 16), the processes of steps 131, 143 to 151, and 161 are repeatedly performed, and the numbers for the designated puzzle elements and the panels in the passable area 122 are temporarily stored, as moving route data, in order of designation in the storage area 372.

On the other hand, if it is concluded in the above mentioned step 147 that the puzzle element (or the panel in the passable area) with the same number has been redundantly designated after the designation of the start-point position, it is determined in the step 155 whether or not this number is the same as the number (coordinate position) for the last designated puzzle element. If the number is the same as the last designated puzzle element, this means the designation of canceling the selection and returning to the previous state (or canceling all), and thus a process of returning by one cell is performed in the step 157. The returning process is the same as described above. On the other hand, if it is concluded that the number is not the same as that for the last designated puzzle element, this means that some puzzle element with a previously designated number has been designated and that the cursor has been operated in such a manner that the moving route forms a loop and intersects with the previously designated puzzle element. Thus, the process moves to the next step 161 while the cursor remains at rest in the step 159. With this, the registration of the designated puzzle elements (writing of the numbers) is prohibited when some operation is performed so as to infringe the rules.

Besides, if it is concluded in the above mentioned step 161 that the end point has been designated as shown in FIG. 18, a process of changing the kind of the puzzle elements on the moving route is performed in a step 163 based on the moving route data from the start point to the end point stored in the storage area 372. By this process, the kind of the puzzle elements on the moving route is changed (inverted) in the step 29 in a cycle of a next main routine.

In a succeeding step 165, a counter for counting the lines to be erased (erase determining counter) is reset (count value n=0). Besides, although not illustrated, the erase determining counter is provided at a certain address in the storage area 373, as with the line counter. In a next step 167, an n-th line is referred to in the display area 121. Then, it is determined in a step 169 whether or not the multi-puzzle element 124m exists there. More specifically, it is determined whether or not the multi-puzzle element 124m is contained in the n-th line. If it is concluded that the multi-puzzle element 124m exists there, it is determined in a step 171 whether or not the other puzzle elements in the n-th line have all the same attribute (color).

If it is concluded that the other puzzle elements in the n-th line are not the same in color, the process goes directly to a step 177 described later. However, it is concluded that the other puzzle elements in the n-th line are not the same in color even if any panel with no puzzle element exists in the n-th line. That is, the line with no puzzle elements displayed in all the panels is not a subject of erasing. On the other hand, if it is concluded that the other puzzle elements in the n-th line are the same in color, the multi-puzzle element 124m is turned into the normal puzzle-element 124b or 124w that is the same in color as the other puzzle elements in the n-th line. Then, in a step 175, an erase flag for the n-th line is turned on. Although not illustrated, the erase flag is also provided at a certain address in the storage area 373. In a succeeding step 177, it is determined whether the count value n is a maximum value or not. That is, it is determined whether or not the erase determination has been performed on all the lines. If it is concluded that the count value n is the maximum value, the process proceeds to a step 189 shown in FIG. 19.

However, if the count value n is not a maximum value, the count value is incremented by 1 (n=n+1), and returns the process to the step 167. That is, the erase determination is carried out on the next line.

On the contrary, if it concludes that the multi-puzzle element 124m does not exist in the n-th line, it is determined in a step 181 whether or not the fixed puzzle element 124f exists in the n-th line. If it is concluded that the fixed puzzle element 124f does not exist in the n-th line, the process goes to a step 203 shown in FIG. 19. Meanwhile, if it is concluded that the fixed puzzle element 124f exists in the n-th line, it is determined in a step 183 whether or not all the puzzle elements in the n-th line are of the same color. If it is concluded that some puzzle element(s) of a different color exist in the n-th line, the process goes to a step 177. Meanwhile, if it is concluded that all the puzzle elements in the n-th line are of the same color, the erase flag for the n-th line is turned on in a step 185. Then, the fixed puzzle element 124f in the n-th line is released from the fixed state, and then moves the process to a step 189. That is, in the step 187, the fixed puzzle element 124f turns into the normal puzzle element 124b or 124w of the same color as the current one.

As shown in FIG. 19, all the lines up to the n-th line in which the puzzle elements are uniformed in kind are erased in the step 189. That is, the lines are erased with the erase flags turned on. In a step 191, the number of the erased lines is subtracted from the count value in the line counter.

Besides, as in the case of the first embodiment, the process of decrementing the line counter is required in the stage-cleared mode, together with the process of step 52. In the endless mode in which, each time puzzle elements in a line are erased, puzzle elements in a new line come down, the number of erased lines is cumulatively counted (that is, the erased lines are added up) and used for score calculation.

Then, in a step 193, it is determined whether or not any puzzle element (non-erased puzzle element) is left in the lines up to the n-th one. If it is concluded that any puzzle element is left in the lines up to the n-th one, the falling process on the left puzzle element(s) is performed in a step 195, and then returns to the step 165 shown in FIG. 18. At that time, all the erase flags are reset (turns off). However, if it is concluded that no puzzle element is left in the lines up to the n-th one, the CPU core 31 calculates the score when required (or only if a score-giving requirement is satisfied). In the score counting process, a predetermined number of scores are given only if the puzzle elements are successfully erased with one stroke (or one move) or scoring is omitted (that is, competition occurs in the number of cleared stages instead of the number of scores) in the stage-cleared mode, or the total number of erased lines is calculated in the endless mode. In a succeeding step 199, it is determined whether or not the count value in the line counter is 0 (count value=0). If it is concluded that the value is not 0, the process returns directly to the step 24. On the other hand, if it is concluded that the count value in the line counter is 0, a stage clearing process (for example, erasing of all the puzzle elements) is performed in a step 201, and then the process returns to the step 24.

Besides, the steps 199 and 201 are omitted in the endless mode. If the stage is cleared, the stage counter is incremented by 1 in the above mentioned step 26, and then proceeds to the step 25 to display the initial screen at a next stage. In this manner, this completes the process of game display at one stage.

Additionally, in a step 203, it is determined whether or not all the puzzle elements in the n-th line are of the same color. That is, it is determined whether or not the puzzle elements in the line are uniformed in kind. If it is concluded that the puzzle elements in the n-th line are different in color, the process returns directly to the step 177 shown in FIG. 18. However, if all the puzzle elements in the n-th line are of the same color, the erase flag for the n-th line is turned on in a step 205, and then returns the process to the step 177.

Then, if it is concluded in the above mentioned step 25 that the game end requirement has been satisfied, the process proceeds to the step 28 to perform a game end process. In the game end process, for example, the CPU core 31 reads game historical data (the numbers for played stages and various kinds of backup data such as gained scores) stored in the W-RAM 37 and writes it into the RAM 25 of the memory card 20. This completes a series of game processes.

As with the first embodiment, the second embodiment also allows the player to feel great gratification and satisfaction.

In addition, the second embodiment provides special puzzle elements such as multi-puzzle elements and fixed puzzle elements, which makes it possible to change the difficulty level of the game in various ways and prevent the player from losing his/her interest in playing the game.

Third Embodiment

In the third embodiment, the hand-held game machine 10 (the CPU core 31) prepares a question (initial screen) at random. A description of the structure of the hand-held game machine 10 is omitted here because it is the same as that of the first embodiment. For example, the player can select the mode for question preparation (question preparation mode) by operating the key switch (the operating switch 15) or touching the touch panel.

The manner (process) in which a question is prepared is described below by the use of FIG. 20 and FIG. 21. In actuality, the hand-held game machine 10 does not display in the screen the manner in which a question is being prepared. FIG. 20 (A) shows one example of an image of an initial screen for question preparation. More specifically, in the image of the initial screen for question preparation, the square cells are formed in a 6 by 6 matrix in the display area 121. Then, a passable area 122 is provided around the display area 121. However, the number of the cells (the initial screen for question preparation) is available in several patterns and can be selected by the player in a cell select screen not illustrated. Also, as understood from FIG. 20 (A), the initial screen for question preparation displays puzzle elements of the same kind in all the cells. In the third embodiment, the normal puzzle elements 124b are displayed in all the cells.

Next, as shown in FIG. 20 (B), a cell as a start point is decided at random. Although not illustrated, for preparing a question, the panels as moving route data are decided and the numbers and coordinate data for them are stored in the storage area 372, as in the case of storing the numbers and coordinate positions (coordinate data) for the cells (panels) on a one-stroke route during the progress of the game. The same applies to the following cases of deciding the cells. In addition, FIG. 20 (B) displays the mark (○) indicative of the state in which the start-point position is decided. Besides, the start-point position is to be decided at random among all the cells, and thus the start point may be not only a cell in the display area 121 but also be a cell in the passing area 122. After deciding the start point, one of the cells adjacent to the start-point cell is selected at random. That is, it is necessary to select in advance one of the cells adjacent to the start-point cell because the game is to be played (the question is to be solved) by selecting a sequence of cells in the manner of one-stroke drawing.

FIG. 21 (A) shows an image of a screen in which the cell adjacent to the start-point cell (here, the cell below the start-point cell) is decided. For example, the next cell is selected at random among the cells around (above, below, left and right) the previously decided cell (including the start-point cell). Therefore, if the selected cell does not follow the rules for one-stroke drawing, another cell is to be selected again at random. If it follows the rules for one-stroke drawing, the selected cell is decided to be the next cell. If the last selected cell is contained in the passable area 122, some one(s) of the upper, lower, left and right cells around the last selected cell does not exist, and thus the nonexistent cell(s) are excluded in advance from the subjects of selection. Also, after some cell is decided, it is determined whether or not to select the next cell at random. That is, it is determined whether or not to decide the cell selected this time as an end point.

Figure 22:
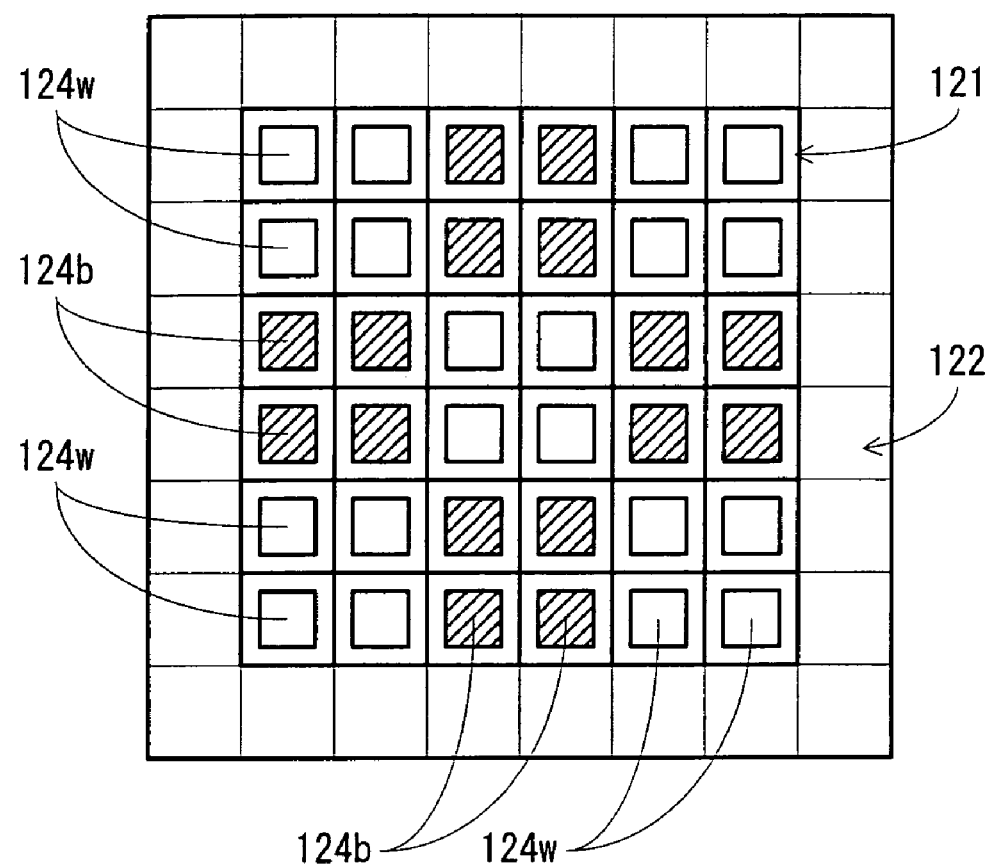
FIG. 22 is an illustrative view showing an image of a question (initial screen) prepared at random in the third embodiment.

FIG. 21 (B) shows a state in which all the cells on the route, as a one-stroke answer, are decided in such a manner to decide a cell and then determine whether or not to decide a next cell, thereby deciding those cells in sequence. In FIG. 21 (B), the mark (□) is shown in the end-point cell. Also, in FIG. 21 (B), the one-stroke route (answer) is indicated by a dotted line. After deciding the route as a one-stroke answer, the initial screen as a question is generated. In the third embodiment, all the normal puzzle elements 124b displayed in the cells other than the cells that are located on the route as a one-stroke answer and contained in the display area 121 are inverted. That is, those puzzle elements are turned into the normal puzzle elements 124w. This allows such a question (initial screen) as shown in FIG. 22 to be generated. In actuality, the type data corresponding to the cells other than the cells located on the one-stroke route and contained in the display area 121 is changed into the data indicative of the normal puzzle elements 124w, and the type data corresponding to the individual panels as initial screen data is stored in the storage area 371. That is, if the question preparation mode is selected, the question preparing process (see FIG. 23 and FIG. 24) is performed before the execution of the main routine shown in FIG. 8 and FIG. 9 or in the step 11 of the main routine, and the prepared question (initial screen) is displayed on the LCD 12.

Besides, in the third embodiment, all the normal puzzle elements 124b displayed in the cells (within the display area 121) other than the cells on the route as a one-stroke answer, are to be inverted. Alternatively, all the normal puzzle elements 124b displayed in the cells (within the display area 121) on the route as a one-stroke answer may be inverted. In addition, which method is to be employed may be decided at random.

Additionally, in the third embodiment, a route from a start point to an end point is to be decided at random. The route is a one-stroke route, and thus the decision of this route is equivalent to the decision of a route from the end point to the start point at random.

Moreover, in the third embodiment, the initial screen for question preparation displays the normal puzzle elements 124b in all the panels. Alternatively, the normal puzzle elements 124w may be displayed instead. In addition, which kind of puzzle elements are to be displayed may be decided at random.

Furthermore, in the third embodiment, the puzzle elements of the same attribute are displayed in all the panels. In this puzzle game, as described in relation to the above stated embodiment, puzzle elements in one line are to be erased if they have the same attribute. Thus, the attribute of puzzle elements are required to be the same in each line, but the attribute of puzzle elements may be different among all the lines. That is, even if the lengthwise puzzle elements have the same attribute, the breadthwise puzzle elements are not always required to have the same attribute.

Figure 23:
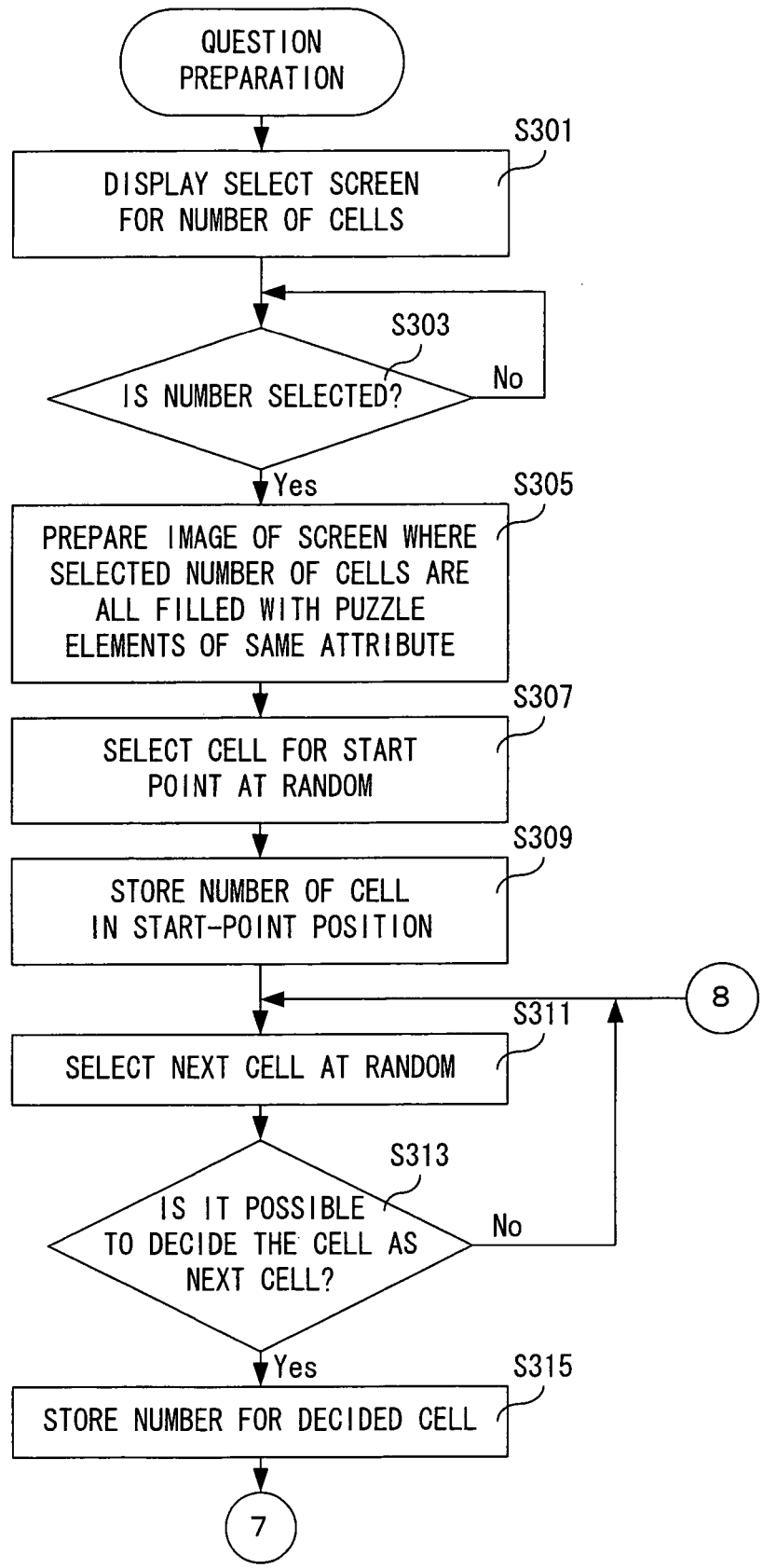
FIG. 23 is a flowchart showing a part of a question preparing process in the third embodiment.
Figure 24:
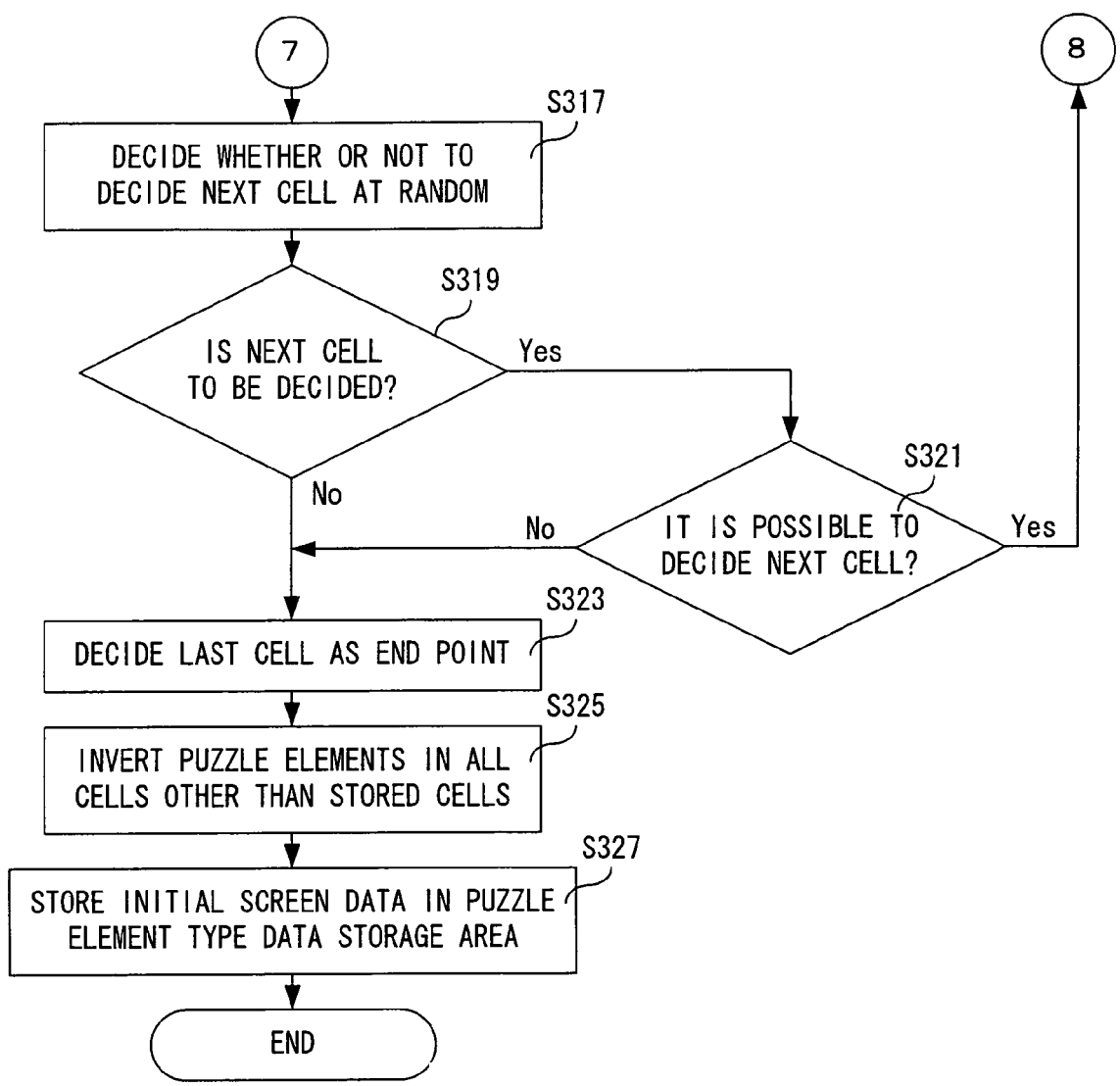
FIG. 24 is a flowchart showing another part of the question preparing process in the third embodiment.

The specific question preparation process is shown in the flowchart of FIG. 23 and FIG. 24. As shown in FIG. 23, when starting the question preparation process, the CPU core 31 displays a puzzle size select screen in a step 301. In a next step 303, it is determined whether the puzzle size (the numbers of lengthwise and breadthwise cells) is selected or not. If the puzzle size is not selected, the process returns to the same step 303. If the puzzle size is selected, an image of a screen in which puzzle elements (the normal puzzle elements 124b and 124w) having the same attribute (black or white) in each line are displayed in the panels of the display area 121 for the selected puzzle, is prepared in a working area of the WRAM 37. Besides, as stated above, the attribute of the puzzle elements are required to be the same in each line, but the attribute of the puzzle elements may be different among all the lines.

Next, the start-point cell at random is selected (decided) in a step 307, and the number for the start-point cell (panel number) is stored in a step 309. Alternatively, coordinate data may be stored instead. After the decision of the start point in this manner, a next cell is selected at random in a step 311. That is, as mentioned above, one of the cells located around the last selected cell is selected at random.

Then, in a step 313, it is determined whether or not the cell selected in the step 311 can be decided as next cell. That is, it is determined whether not the cell follows the one-stroke rules. If it is concluded that the cell cannot be decided as next cell, the process returns to the step 311 to select a next cell again at random. On the contrary, if it is concluded that the cell can be decided as next cell, the panel number for the decided cell is stored in a step 315.

Next, as shown in FIG. 24, it is determined whether or not to decide the next cell at random in a step 317. Then, in a step 319, it is determined whether or not to decide a next cell. If it is concluded that the next cell is not to be decided, the process proceeds directly to step 323. However, if it is concluded that the next cell is to be decided, it is determined in a step 321 whether it is possible or not to decide the next cell in the step 321. For example, if the last decided cell is the cell corresponding to the upper left corner in the puzzle, and the second last decided cell is the cell below the last decided cell, and the cell decided further earlier than that is the cell on the right of the last decided cell, it is not possible to decide the next cell under the one-stroke drawing rules. It is determined whether or not the puzzle is in such a situation (state) as stated above.

If it is concluded that it is possible to decide the next cell, the process returns to the step 311 shown in FIG. 23. Conversely, if it is concluded that it is not possible to decide the next cell, the process proceeds to a step 323. In the step 323, the last decided cell is decided as end-point cell. Subsequently, in a step 325, the puzzle elements in all the cells except for the stored cells (panel numbers) are inverted. Then, the initial screen data, i.e. the type data of the puzzle elements to be displayed is stored in the storage area 372. This completes the question preparation process.

According to the third embodiment, a question can be prepared at random, which makes it possible to increase the number of questions and thus provide a game that is hard for the player to get tired of playing it.

Moreover, in the third embodiment, it is decided at random whether or not to select the next cell. Accordingly, it is possible to change the length of a one-stroke drawing route approximately every time and thus prepare a wide variety of questions.

In the third embodiment, as stated above, a question is prepared at random. This makes it possible to suppress an increase in the amount of initial screen data to some degree and thus prevent a waste of memory capacity.

Besides, in the third embodiment, the start-point cell and the end-point cell are to be decided at random. Alternatively, the start-point cell and the end-point cell may be selected (designated) by the player.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A puzzle element display game apparatus, comprising:
   a display that has a display area to which a plurality of cells are assigned lengthwise and breadthwise, and displays one of at least two types of puzzle elements in each of the cells;
   a puzzle element type storage that stores data regarding the type of puzzle element displayed in each of the plurality cells;
   an operating unit capable of designating at least the puzzle elements in the cells displayed in said display;
   a processor;
   a memory coupled to the processor, the memory storing instructions that, when executed by the processor, control the processor to:
   display at least one of the two types of puzzle elements in each of said cells based on the data stored in the puzzle element type storage; and
   change the type of puzzle element displayed in a plurality of designated cells which are consecutively designated through said operating unit from a designation start point to a designation end point in such a manner as to change the currently displayed type of puzzle element into another one of the at least two types of puzzle elements in each of the plurality of designated cells; and
   determine whether or not the type of puzzle elements after said changing step satisfies a predetermined requirement.

2. A puzzle element display game apparatus according to claim 1, wherein the processor is further configured to:
   rewrite a storage state of said puzzle element type storage so as to erase said puzzle elements determined to satisfy a predetermined requirement, and
   determine whether or not all of said puzzle elements displayed in each of the plurality of cells are erased.

3. A puzzle element display game apparatus according to claim 1, wherein
   the type of said plurality of puzzle elements consecutively designated by said operating unit are designated in a manner of one-stroke drawing.

4. A puzzle element display game apparatus according to claim 1, wherein
   the type of said plurality of puzzle elements designated through said operating unit are changed in such a manner that a continuous route is designated from the designation start point to the designation end point is formed.

5. A puzzle element display game apparatus according to claim 4, wherein the processor is further controlled to
   display a passable area around said display area, wherein said operating unit allows the designation of said passable area, and
   even if there exists said any passable area on the route designated through said operating unit, it is concluded that the designated route is continuous.

6. A puzzle element display game apparatus according to claim 1, wherein
   initial screen data for displaying said puzzle elements in said cells at the start of the game is stored; and
   when a start of the game is designated, the stored initial screen data stored is written into a corresponding storage area in said puzzle element type storage.

7. A puzzle element display game apparatus according to claim 1, wherein
   said operating unit includes a coordinate designator configured to designate the coordinate position of the display area in said display, and the type of puzzle element displayed in each of the plurality of cells existing on the route from the designation start point to the designation end point is changed in such a manner as to turn the currently displayed type of puzzle element into another one of the at least two types of puzzle elements.

8. A puzzle element display game apparatus according to claim 1, wherein
said at least two types of puzzle elements includes a special puzzle element, and
based on an assumption that said puzzle element with respect to said cell corresponding to said special puzzle element would satisfy said predetermined requirement based on the type of puzzle element changed, it is determined whether or not the type of puzzle element changed satisfies said predetermined requirement.

9. A puzzle element display game apparatus according to claim 1, further comprising:
a storage state of said puzzle element type storage is rewritten in such a manner as to erase said puzzle elements determined to satisfy a predetermined requirement; and
when said puzzle element determined to satisfy the predetermined requirement has been erased, the storage state of said puzzle element type storage is changed in such a manner that at least a puzzle element displayed adjacent to the erased puzzle element is moved to a cell at an end of said display area or to a cell adjacent to another puzzle element.

10. A puzzle element display game apparatus according to claim 1, wherein
there are two kinds of puzzle elements, and
the processor is further controlled to
store, in an initial state storage, the type of puzzle element displayed in each of said plurality of cells and satisfying said predetermined requirement;
select at least two consecutive cells at random; and
change said type of puzzle element with respect to the cell selected by said cell selector or the cell not selected by said cell selector which is stored in said initial state storage, in such a manner as to indicate the other one of the two kinds of puzzle elements, wherein
said changed type data, which is stored in said initial state storage, is taken as data in said puzzle element storage at a start of the game.

11. A puzzle element display game apparatus according to claim 10, wherein
a cell is set as a start point at random, and a cell adjacent to the previously set cell, is set as a next cell at random.

12. A puzzle element display game apparatus according to claim 11, wherein
the next cell is not an already selected cell.

13. A puzzle element display game apparatus according to claim 11, wherein said processor is further configured to:
decide at random whether or not to select a next cell; and
when it is decided not to select the next cell, the last selected cell is set designation end point.

14. A non-transitory computer-readable storage medium storing a puzzle element display game program, wherein, in a game apparatus that has a display area to which a plurality of cells are assigned lengthwise and breadthwise and comprises a display for displaying at least two types of puzzle elements in each of the cells in the display area, a puzzle element type storage for storing data regarding the type of puzzle element displayed in each of the plurality of, and an operating unit for designating at least the puzzle elements displayed in said display,
the puzzle element display game program controls a processor of said game apparatus to execute:
displaying at least one of the two types of puzzle elements in each of said cells based on the data stored in the puzzle element type storage,
changing the type of puzzle element displayed in a plurality of designated cells which are consecutively designated through said operating unit from a designation start point to a designation end point in such a manner as to turn the currently displayed type of puzzle element into another one of the at least two types of puzzle elements in each of the plurality of designated, and
determining whether or not the type of puzzle element displayed in the plurality of designated cells which were changed satisfies a predetermined requirement.

15. The non-transitory storage medium according to claim 14, wherein the processor is further configured to:
rewrite a storage state of said puzzle element type storage so as to erase said puzzle elements determined to satisfy a predetermined requirement, and
determine whether or not all of said puzzle elements displayed in each of the plurality of cells are erased.

16. The non-transitory storage medium according to claim 14, wherein the type of said plurality of puzzle elements consecutively designated by said operating unit are designated in a manner of one-stroke drawing.

17. The non-transitory storage medium according to claim 14, wherein the type of said plurality of puzzle elements designated through said operating unit are changed in such a manner that a continuous route is designated from the designation start point to the designation end point is formed.

18. The non-transitory storage medium according to claim 17, wherein the processor is further controlled to
display a passable area around said display area, wherein
said operating unit allows the designation of said passable area, and
even if there exists said any passable area on the route designated through said operating unit, it is concluded that the designated route is continuous.

19. The non-transitory storage medium according to claim 14, wherein
initial screen data for displaying said puzzle elements in said cells at the start of the game is stored; and
when a start of the game is designated, the stored initial screen data stored is written into a corresponding storage area in said puzzle element type storage.

20. The non-transitory storage medium according to claim 14, wherein
said operating unit includes a coordinate designator configured to designate the coordinate position of the display area in said display, and
the type of puzzle element displayed in each of the cells existing on the route from the designation start point to the designation end point are changed in such a manner as to turn the currently displayed type of puzzle element into another one of the at least two types of puzzle elements.

21. The non-transitory storage medium according to claim 14, wherein
said at least two types of puzzle elements includes a special puzzle element, and
based on an assumption that said puzzle element with respect to said cell corresponding to said special puzzle element would satisfy said predetermined requirement based on the type of puzzle element changed, it is determined whether or not the type of puzzle element changed satisfies said predetermined requirement.

22. The non-transitory storage medium according to claim 14, further comprising:
- a storage state of said puzzle element type storage is rewritten in such a manner as to erase said puzzle elements determined to satisfy a predetermined requirement; and
- when said puzzle element determined to satisfy the predetermined requirement has been erased, the storage state of said puzzle element type storage is changed in such a manner that at least a puzzle element displayed adjacent to the erased puzzle element is moved to a cell at an end of said display area or to a cell adjacent to another puzzle element.

23. The non-transitory storage medium according to claim 14, wherein
- there are two kinds of puzzle elements, and
- the processor is further controlled to
- store, in an initial state storage, the type of puzzle element displayed in each of said plurality of cells and satisfying said predetermined requirement;
- select at least two consecutive cells at random; and
- change said type of puzzle element with respect to the cell selected by said cell selector or the cell not selected by said cell selector which is stored in said initial state storage, in such a manner as to indicate the other one of the two kinds of puzzle elements, wherein
- said changed type data, which is stored in said initial state storage, is taken as data in said puzzle element storage at a start of the game.

24. The non-transitory storage medium according to claim 23, wherein
- a cell is set as a start point at random, and a cell adjacent to the previously set cell, is set as a next cell at random.

25. The non-transitory storage medium according to claim 24, wherein said processor is further configured to:
- decide at random whether or not to select a next cell; and
- when it is decided not to select the next cell, the last selected cell is set designation end point.

26. The non-transitory storage medium according to claim 14, wherein
- the next cell is not an already selected cell.

* * * * *